United States Patent
Li et al.

(10) Patent No.: US 10,069,593 B2
(45) Date of Patent: Sep. 4, 2018

(54) BANDWIDTH SELECTION METHOD OF WIRELESS FIDELITY TECHNOLOGY AND ACCESS POINT AP

(71) Applicant: Huawei Technologies Co., Ltd., Shenzhen (CN)

(72) Inventors: Jianwei Li, Xi'an (CN); Guihong Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 15/322,301

(22) PCT Filed: Jul. 7, 2014

(86) PCT No.: PCT/CN2014/081741
§ 371 (c)(1),
(2) Date: Dec. 27, 2016

(87) PCT Pub. No.: WO2016/004566
PCT Pub. Date: Jan. 14, 2016

(65) Prior Publication Data
US 2017/0134119 A1 May 11, 2017

(51) Int. Cl.
*H04L 1/00* (2006.01)
*H04W 28/20* (2009.01)
(Continued)

(52) U.S. Cl.
CPC ........... *H04L 1/0009* (2013.01); *H04W 28/20* (2013.01); *H04W 48/08* (2013.01);
(Continued)

(58) Field of Classification Search
None
See application file for complete search history.

(56) References Cited

U.S. PATENT DOCUMENTS

2006/0056380 A1  3/2006 Mitsugi et al.
2008/0305817 A1* 12/2008 Namekata ............. H04W 16/14
                                                        455/507
(Continued)

FOREIGN PATENT DOCUMENTS

CN   101296111 A   10/2008
CN   101990315 A    3/2011
(Continued)

OTHER PUBLICATIONS

Machine Translation and Abstract of Chinese Publication No. CN103889007, Jun. 25, 2014, 14 pages.
(Continued)

*Primary Examiner* — Bunjob Jaroenchonwanit
(74) *Attorney, Agent, or Firm* — Conley Rose, P.C.

(57) ABSTRACT

Embodiments of the present disclosure provide a bandwidth selection method of a WiFi technology and an AP, and in the method, the AP obtains a negotiation bandwidth negotiated by the AP and a station STA. The method includes receiving, by the AP, a data transmission request of the STA, obtaining, by the AP, a transmission bandwidth upper limit of the STA, and delivering, by the AP, a first MCS to the STA if the transmission bandwidth upper limit is less than the negotiation bandwidth, where the first MCS is less than an MCS that corresponds to the negotiation bandwidth and that is in a correspondence between a bandwidth and an MCS, and is greater than or equal to an MCS that corresponds to the transmission bandwidth upper limit and that is in the correspondence between a bandwidth and an MCS.

20 Claims, 5 Drawing Sheets

(51) Int. Cl.
*H04W 52/02* (2009.01)
*H04W 48/08* (2009.01)
*H04W 72/04* (2009.01)
*H04W 84/12* (2009.01)

(52) U.S. Cl.
CPC ... *H04W 52/0206* (2013.01); *H04W 52/0209* (2013.01); *H04W 72/0426* (2013.01); *H04W 84/12* (2013.01)

(56) References Cited

U.S. PATENT DOCUMENTS

| | | | |
|---|---|---|---|
| 2009/0059877 A1* | 3/2009 | Utsunomiya | H04W 74/0808 370/338 |
| 2010/0091691 A1 | 4/2010 | Dorsey et al. | |
| 2010/0248708 A1* | 9/2010 | Koivisto | H04L 1/0003 455/419 |
| 2011/0105025 A1* | 5/2011 | Wang | H04L 1/0019 455/41.2 |
| 2011/0299468 A1* | 12/2011 | Van Nee | H04L 27/2613 370/328 |
| 2012/0307769 A1 | 12/2012 | Fujita et al. | |
| 2013/0208606 A1* | 8/2013 | Merlin | H04L 1/0025 370/252 |
| 2014/0269457 A1* | 9/2014 | Folke | H04L 1/1893 370/280 |
| 2015/0092697 A1* | 4/2015 | Yeow | H04L 1/0025 370/329 |
| 2015/0249936 A1* | 9/2015 | Chen | H04W 28/065 370/329 |
| 2015/0271701 A1* | 9/2015 | Baik | H04L 27/2602 370/474 |
| 2015/0282203 A1* | 10/2015 | Liu | H04W 72/1236 370/329 |
| 2015/0358967 A1 | 12/2015 | Xie et al. | |
| 2015/0373730 A1* | 12/2015 | Fujishiro | H04L 1/0003 455/450 |
| 2015/0382222 A1* | 12/2015 | Park | H04L 1/00 370/252 |
| 2016/0056868 A1* | 2/2016 | Adachi | H04W 52/0206 370/329 |
| 2016/0080043 A1* | 3/2016 | Tian | H04B 7/022 375/267 |
| 2016/0344511 A1* | 11/2016 | Srinivasa | H04L 1/0016 |
| 2017/0134119 A1* | 5/2017 | Li | H04L 1/0009 |

FOREIGN PATENT DOCUMENTS

| | | |
|---|---|---|
| CN | 103889007 A | 6/2014 |
| WO | 2011096437 A1 | 8/2011 |
| WO | 2013028844 A1 | 2/2013 |
| WO | 2014048345 A1 | 4/2014 |

OTHER PUBLICATIONS

Foreign Communication From a Counterpart Application, European Application No. 14896990.0, Extended European Search Report dated Apr. 28, 2017, 8 pages.

Foreign Communication From a Counterpart Application, PCT Application No. PCT/CN2014/081741, English Translation of International Search Report dated Apr. 10, 2015, 2 pages.

Foreign Communication From a Counterpart Application, PCT Application No. PCT/CN2014/081741, English Translation of Written Opinion dated Apr. 10, 2015, 6 pages.

Foreign Communication From a Counterpart Application, Japanese Application No. 2017-500974, Japanese Office Action dated Feb. 27, 2018, 3 pages.

Foreign Communication From a Counterpart Application, Japanese Application No. 2017-500974, English Translation of Japanese Office Action dated Feb. 27, 2018, 3 pages.

* cited by examiner

BANDWIDTH SELECTION METHOD OF WIRELESS FIDELITY TECHNOLOGY AND ACCESS POINT AP

CROSS REFERENCE TO RELATED APPLICATIONS

This application is a National Stage of International Application No. PCT/CN2014/081741, filed on Jul. 7, 2014, which is hereby incorporated by reference in its entirety.

TECHNICAL FIELD

Embodiments of the present disclosure relate to wireless communications technologies, and in particular, to a bandwidth selection method of a Wireless Fidelity technology and an access point AP.

BACKGROUND

The Wireless Fidelity (WiFi) technology is a wireless local area network standard, and a WiFi network is a communications network including an Access Point (AP) and Station (STA). The AP is generally referred to as a network bridge or an access point, and is used to allocate a network resource of an uplink segment of the AP, such as a resource of a wide area network (WAN) or a local area network (LAN), to a downlink segment of the AP, that is, a communications network between the AP and the STA.

At present, during bandwidth selection, a rate adaptation algorithm is mainly adopted in the WiFi technology. An AP obtains, according to the rate adaption algorithm, a negotiation bandwidth negotiated by the AP and a STA, and selects a corresponding Modulation and Coding Scheme (MCS) from a bandwidth control table according to the negotiation bandwidth negotiated by the AP and the STA. When the STA needs to access a network to transmit data, the AP delivers, to the STA, the MCS selected in the foregoing process to select a transmission bandwidth.

Although there are a large quantity of rate adaptation algorithms currently, and all rate adaptation algorithms have different input parameters and specific calculation manners, on the whole, a negotiation bandwidth negotiated by an AP and a STA is calculated based on channel quality between the AP and the STA, such as an received signal strength indicator (RSSI), a packet success rate (PSR), and a packet error rate (PER). Through studying, the inventor finds that if only the foregoing channel quality is considered during bandwidth selection, factors considered are usually not comprehensive. In some scenarios, an actual transmission bandwidth between the AP and the STA cannot reach a transmission bandwidth selected based on the rate adaptation algorithm, and in this case, the transmission bandwidth is improperly high, which further leads to increased power consumption of AP and STA side devices and a shorter standby time.

SUMMARY

To resolve the foregoing technical problems, embodiments of the present disclosure provide a bandwidth selection method of a WiFi technology and an access point AP to reduce a transmission bandwidth in a scenario in which the transmission bandwidth is improperly high, thereby reducing power consumption of AP and STA side devices and increasing a standby time thereof.

In view of this, in the embodiments of the present disclosure, technical solutions used to resolve the technical problems are as follows According to a first aspect, an embodiment of the present disclosure provides a bandwidth selection method of a WiFi technology, where an access point AP obtains a negotiation bandwidth negotiated by the AP and a station STA, and the method includes receiving, by the AP, a data transmission request of the STA, obtaining, by the AP, a transmission bandwidth upper limit of the STA, and delivering, by the AP, a first modulation and coding scheme MCS to the STA if the transmission bandwidth upper limit is less than the negotiation bandwidth, where the first MCS is less than an MCS that corresponds to the negotiation bandwidth and that is in a correspondence between a bandwidth and an MCS, and is greater than or equal to an MCS that corresponds to the transmission bandwidth upper limit and that is in the correspondence between a bandwidth and an MCS.

In a first possible implementation manner of the first aspect, the method further includes obtaining a second MCS according to the negotiation bandwidth, where the second MCS is the MCS that corresponds to the negotiation bandwidth and that is in the correspondence between a bandwidth and an MCS, and obtaining a third MCS according to the transmission bandwidth upper limit, where the third MCS is the MCS that corresponds to the transmission bandwidth upper limit and that is in the correspondence between a bandwidth and an MCS, and the delivering, by the AP, a first modulation and coding scheme MCS to the STA if the transmission bandwidth upper limit is less than the negotiation bandwidth includes delivering, by the AP, the first MCS to the STA if the third MCS is less than the second MCS.

With reference to the first possible implementation manner of the first aspect, in a second possible implementation manner of the first aspect, the delivering, by the AP, the first MCS to the STA includes delivering, by the AP, the third MCS to the STA.

In a third possible implementation manner of the first aspect, the method further includes obtaining a third MCS according to the transmission bandwidth upper limit, where the third MCS is the MCS that corresponds to the transmission bandwidth upper limit and that is in the correspondence between a bandwidth and an MCS, and the delivering, by the AP, a first modulation and coding scheme MCS to the STA includes delivering, by the AP, the third MCS to the STA.

With reference to any one of the first aspect or the first to the third possible implementation manners of the first aspect, in a fourth possible implementation manner of the first aspect, the transmission bandwidth upper limit of the STA is obtained based on a transmission bandwidth of an uplink segment of the AP and/or a required transmission bandwidth of the STA.

With reference to the fourth possible implementation manner of the first aspect, in a fifth possible implementation manner of the first aspect, that the transmission bandwidth upper limit of the STA is obtained based on a transmission bandwidth of an uplink segment of the AP and a required transmission bandwidth of the STA includes the transmission bandwidth upper limit of the STA is the lower bandwidth of the transmission bandwidth of the uplink segment of the AP and the required transmission bandwidth of the STA.

With reference to the fourth or the fifth possible implementation manner of the first aspect, in a sixth possible implementation manner of the first aspect, a manner of obtaining the transmission bandwidth of the uplink segment of the AP includes obtaining, by the AP, a size of a resource block allocated to the uplink segment of the AP, and obtaining, by the AP, the transmission bandwidth of the uplink segment of the AP based on the size of the resource block.

With reference to the fourth or the fifth possible implementation manner of the first aspect, in a seventh possible implementation manner of the first aspect, a manner of obtaining the required transmission bandwidth of the STA includes obtaining, by the AP, a service type of transmission data from the data transmission request, and obtaining, by the AP, the required transmission bandwidth of the STA based on the service type.

With reference to any one of the first aspect or the first to the seventh possible implementation manners of the first aspect, in an eighth possible implementation manner of the first aspect, the method further includes performing, by the AP, data transmission with the STA based on the first MCS, and if the MCS corresponding to the negotiation bandwidth is updated in a data transmission process, determining, by the AP, whether the MCS corresponding to the transmission bandwidth upper limit is less than an MCS corresponding to an updated negotiation bandwidth, and if yes, updating the first MCS and delivering an updated first MCS to the STA, where the updated first MCS is less than the MCS corresponding to the updated negotiation bandwidth, and is greater than or equal to the MCS corresponding to the transmission bandwidth upper limit.

According to a second aspect, an embodiment of the present disclosure provides an access point AP, including a transmitter, a receiver, and a processor, where the transmitter is connected to the processor, and the receiver is connected to the processor, the receiver is configured to receive a data transmission request of a station STA, the processor is configured to obtain a negotiation bandwidth negotiated by the AP and the STA, and obtain a transmission bandwidth upper limit of the STA after the receiver receives the data transmission request, and the transmitter is configured to deliver a first modulation and coding scheme MCS to the STA if the processor determines that the transmission bandwidth upper limit is less than the negotiation bandwidth, where the first MCS is less than an MCS that corresponds to the negotiation bandwidth and that is in a correspondence between a bandwidth and an MCS, and is greater than or equal to an MCS that corresponds to the transmission bandwidth upper limit and that is in the correspondence between a bandwidth and an MCS.

In a first possible implementation manner of the second aspect, the processor is further configured to obtain a second MCS according to the negotiation bandwidth, and obtain a third MCS according to the transmission bandwidth upper limit, where the second MCS is the MCS that corresponds to the negotiation bandwidth and that is in the correspondence between a bandwidth and an MCS, and the third MCS is the MCS that corresponds to the transmission bandwidth upper limit and that is in the correspondence between a bandwidth and an MCS, and that the transmitter is configured to deliver a first modulation and coding scheme MCS to the STA if the processor determines that the transmission bandwidth upper limit is less than the negotiation bandwidth includes the transmitter is configured to deliver the first MCS to the STA if the processor determines that the third MCS is less than the second MCS.

With reference to the first possible implementation manner of the second aspect, in a second possible implementation manner of the second aspect, that the transmitter is configured to deliver the first MCS to the STA includes the transmitter is configured to deliver the third MCS to the STA.

In a third possible implementation manner of the second aspect, the processor is further configured to obtain a third MCS according to the transmission bandwidth upper limit, where the third MCS is the MCS that corresponds to the transmission bandwidth upper limit and that is in the correspondence between a bandwidth and an MCS, and that the transmitter is configured to deliver a first modulation and coding scheme MCS to the STA includes the transmitter is configured to deliver the third MCS to the STA.

With reference to any one of the second aspect or the first to the third possible implementation manners of the second aspect, in a fourth possible implementation manner of the second aspect, the transmission bandwidth upper limit of the STA is obtained based on a transmission bandwidth of an uplink segment of the AP and/or a required transmission bandwidth of the STA.

With reference to the fourth possible implementation manner of the second aspect, in a fifth possible implementation manner of the second aspect, that the transmission bandwidth upper limit of the STA is obtained based on a transmission bandwidth of an uplink segment of the AP and a required transmission bandwidth of the STA includes the transmission bandwidth upper limit of the STA is the lower bandwidth of the transmission bandwidth of the uplink segment of the AP and the required transmission bandwidth of the STA.

With reference to the fourth or the fifth possible implementation manner of the second aspect, in a sixth possible implementation manner of the second aspect, a manner of obtaining the transmission bandwidth of the uplink segment of the AP includes obtaining, by the processor, a size of a resource block allocated to the uplink segment of the AP, and obtaining, by the processor, the transmission bandwidth of the uplink segment of the AP based on the size of the resource block.

With reference to the fourth or the fifth possible implementation manner of the second aspect, in a seventh possible implementation manner of the second aspect, a manner of obtaining the required transmission bandwidth of the STA includes obtaining, by the processor, a service type of transmission data from the data transmission request, and obtaining, by the processor, the required transmission bandwidth of the STA based on the service type.

With reference to any one of the second aspect or the first to the seventh possible implementation manners of the second aspect, in an eighth possible implementation manner of the second aspect, the receiver and the transmitter are further configured to perform data transmission with the STA based on the first MCS, and the processor is further configured to if the MCS corresponding to the negotiation bandwidth is updated in a data transmission process, determine whether the MCS corresponding to the transmission bandwidth upper limit is less than an MCS corresponding to an updated negotiation bandwidth, and if yes, update the first MCS and instruct the transmitter to deliver an updated first MCS to the STA, where the updated first MCS is less than the MCS corresponding to the updated negotiation bandwidth, and is greater than or equal to the MCS corresponding to the transmission bandwidth upper limit.

According to a third aspect, an embodiment of the present disclosure provides an access point AP, including a first obtaining module configured to obtain a negotiation bandwidth negotiated by the AP and a station STA, a request receiving module configured to receive a data transmission request of the STA, a second obtaining module configured to obtain a transmission bandwidth upper limit of the STA after the request receiving module receives the data transmission request, and a delivery module configured to deliver a first modulation and coding scheme MCS to the STA if the transmission bandwidth upper limit is less than the negotiation bandwidth, where the first MCS is less than an MCS that corresponds to the negotiation bandwidth and that is in a correspondence between a bandwidth and an MCS, and is greater than or equal to an MCS that corresponds to the transmission bandwidth upper limit and that is in the correspondence between a bandwidth and an MCS.

In a first possible implementation manner of the third aspect, the AP further includes a third obtaining module configured to obtain a second MCS according to the negotiation bandwidth, where the second MCS is the MCS that corresponds to the negotiation bandwidth and that is in the correspondence between a bandwidth and an MCS, and a fourth obtaining module configured to obtain a third MCS according to the transmission bandwidth upper limit, where the third MCS is the MCS that corresponds to the transmission bandwidth upper limit and that is in the correspondence between a bandwidth and an MCS, where that the delivery module is configured to deliver the first modulation and coding scheme MCS to the STA if the transmission bandwidth upper limit is less than the negotiation bandwidth includes the delivery module is configured to deliver the first MCS to the STA if the third MCS is less than the second MCS.

With reference to the first possible implementation manner of the third aspect, in a second possible implementation manner of the third aspect, that the delivery module is configured to deliver the first MCS to the STA includes the delivery module is configured to deliver the third MCS to the STA.

In a third possible implementation manner of the third aspect, the AP further includes a fourth obtaining module configured to obtain a third MCS according to the transmission bandwidth upper limit, where the third MCS is the MCS that corresponds to the transmission bandwidth upper limit and that is in the correspondence between a bandwidth and an MCS, where that the delivery module is configured to deliver the first modulation and coding scheme MCS to the STA includes the delivery module is configured to deliver the third MCS to the STA.

With reference to any one of the third aspect or the first to the third possible implementation manners of the third aspect, in a fourth possible implementation manner of the third aspect, the transmission bandwidth upper limit of the STA is obtained based on a transmission bandwidth of an uplink segment of the AP and/or a required transmission bandwidth of the STA.

With reference to the fourth possible implementation manner of the third aspect, in a fifth possible implementation manner of the third aspect, that the transmission bandwidth upper limit of the STA is obtained based on a transmission bandwidth of an uplink segment of the AP and a required transmission bandwidth of the STA includes the transmission bandwidth upper limit of the STA is the lower bandwidth of the transmission bandwidth of the uplink segment of the AP and the required transmission bandwidth of the STA.

With reference to the fourth or the fifth possible implementation manner of the third aspect, in a sixth possible implementation manner of the third aspect, a manner of obtaining the transmission bandwidth of the uplink segment of the AP includes obtaining, by the second obtaining module, a size of a resource block allocated to the uplink segment of the AP, and obtaining, by the second obtaining module, the transmission bandwidth of the uplink segment of the AP based on the size of the resource block.

With reference to the fourth or the fifth possible implementation manner of the third aspect, in a seventh possible implementation manner of the third aspect, a manner of obtaining the required transmission bandwidth of the STA includes obtaining, by the second obtaining module, a service type of transmission data from the data transmission request, and obtaining, by the second obtaining module, the required transmission bandwidth of the STA based on the service type.

With reference to any one of the third aspect or the first to the seventh possible implementation manners of the third aspect, in an eighth possible implementation manner of the third aspect, the AP further includes a transmission module configured to perform data transmission with the STA based on the first MCS, and a determining module configured to if the MCS corresponding to the negotiation bandwidth is updated in a data transmission process, determine whether the MCS corresponding to the transmission bandwidth upper limit is less than an MCS corresponding to an updated negotiation bandwidth, and if yes, update the first MCS and instruct the delivery module to deliver an updated first MCS to the STA, where the updated first MCS is less than the MCS corresponding to the updated negotiation bandwidth, and is greater than or equal to the MCS corresponding to the transmission bandwidth upper limit.

It can be learned from the foregoing technical solutions that in the embodiments of the present disclosure, during bandwidth selection, not only a negotiation bandwidth negotiated by an access point AP and a station STA is considered, but also a transmission bandwidth upper limit of the station STA is considered, and a finally delivered modulation and coding scheme MCS is reduced according to the transmission bandwidth upper limit of the STA in some scenarios of improperly high transmission bandwidths, thereby reducing a delivered transmission bandwidth. Therefore, power consumption of access point AP and station STA side devices is reduced, and a standby time thereof is increased.

BRIEF DESCRIPTION OF DRAWINGS

To describe the technical solutions in embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
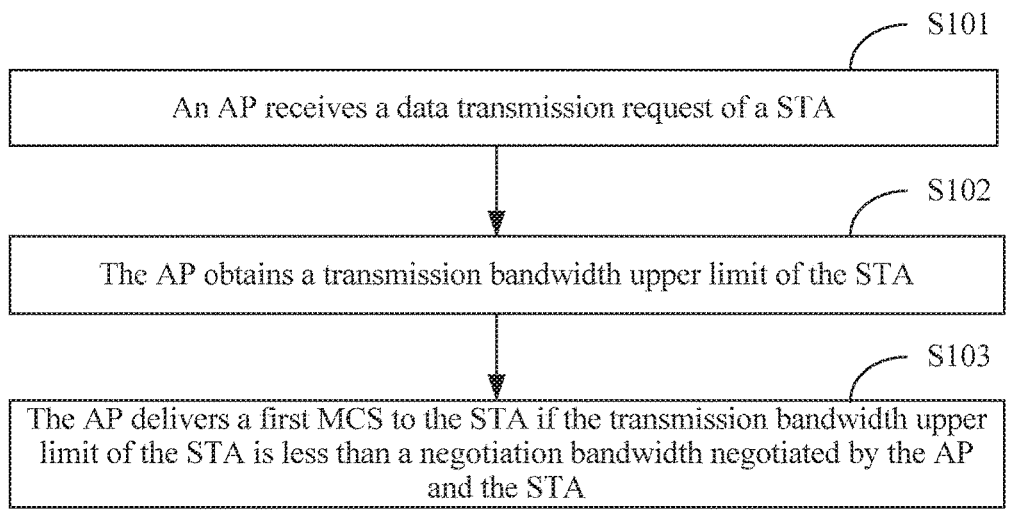
FIG. 1 is a specific flowchart of a first method embodiment according to an embodiment of the present disclosure.

At present, during bandwidth selection, a rate adaptation algorithm (Autorate algorithm) is mainly adopted in a WiFi technology. When an AP establishes a channel to a STA for the first time, or a channel status between an AP and a STA changes (for example, when the STA moves), the AP obtains, according to the rate adaption algorithm, a negotiation bandwidth negotiated by the AP and the STA, and selects a corresponding MCS from a bandwidth control table according to the negotiation bandwidth negotiated by the AP and the STA. When the STA needs to access a network to transmit data, the AP receives a data transmission request of the STA, and in this case, the AP delivers, to the STA, the MCS selected in the foregoing process to select a transmission bandwidth.

Although currently there are a large quantity of rate adaptation algorithms, and all rate adaptation algorithms have different input parameters and specific calculation manners, on the whole, a negotiation bandwidth negotiated by an AP and a STA is calculated based on channel quality between the AP and the STA, such as an RSSI, a PSR, and a PER.

Through studying, the inventor finds that if only the foregoing channel quality is considered during bandwidth selection, factors considered are usually not comprehensive. In some scenarios, because of some limitations, an actual transmission bandwidth between the AP and the STA cannot reach a transmission bandwidth selected based on the rate adaptation algorithm, and in this case, the transmission bandwidth is improperly high, which further leads to increased power consumption of AP and STA side devices and a shorter standby time.

However, embodiments of the present disclosure provide a bandwidth selection method of the WiFi technology and an access point AP to reduce a transmission bandwidth in a scenario in which the transmission bandwidth is improperly high, thereby reducing power consumption of AP and STA side devices and increasing a standby time.

The following clearly and completely describes the technical solutions in embodiments of the present disclosure with reference to the accompanying drawings in the embodiments of the present disclosure. The described embodiments are merely some but not all of the embodiments of the present disclosure. All other embodiments obtained by persons skilled in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Method Embodiment 1

Referring to FIG. 1, this embodiment of the present disclosure provides a first embodiment of a bandwidth selection method of the WiFi technology. In this embodiment, an AP obtains a negotiation bandwidth negotiated by the AP and a STA.

In this embodiment, that the AP obtains the negotiation bandwidth negotiated by the AP and the STA may take place when the AP establishes a channel to the STA for the first time, or a channel status between the AP and the STA changes, for example, when the STA moves. Herein, the AP may obtain, according to a rate adaptation algorithm, the negotiation bandwidth negotiated by the AP and the STA. The rate adaptation algorithm is a prior-art algorithm that is used to obtain a negotiation bandwidth negotiated by an AP and a STA. In specific implementation, first the AP obtains channel quality between the AP and the STA, such as an RSSI, a PSR, a PER, and another parameter, and then, using any one of rate adaptation algorithms and according to the obtained channel quality, calculates the negotiation bandwidth negotiated by the AP and the STA.

This embodiment includes the following steps:

S101. An AP receives a data transmission request of a STA.

When the STA needs to access a network to transmit data, the AP receives the data transmission request of the STA. The request may be sent by the STA, for example, the STA sends a data transmission request to the AP when a STA side user taps play a video, or the request may be sent by an uplink end of the AP, for example, when a WAN side or a LAN side needs to push data to the STA, the WAN side or the LAN side sends a data transmission request of the STA to the AP.

S102. The AP obtains a transmission bandwidth upper limit of the STA.

In this embodiment of the present disclosure, the transmission bandwidth upper limit of the STA refers to a highest actual bandwidth that can be reached in a process of data transmission between the STA and the AP.

Through studying, the inventor finds that in some application scenarios, the transmission bandwidth upper limit of the STA imposes a limitation on an actual transmission bandwidth. For example, if the transmission bandwidth upper limit of the STA is less than a negotiation bandwidth negotiated by the AP and the STA, it is likely that an actual transmission bandwidth between the AP and the STA cannot reach a transmission bandwidth selected based on an existing rate adaptation algorithm, thereby causing an improperly high transmission bandwidth problem. Therefore, in this embodiment, after the data transmission request of the STA is received, a bandwidth is not directly delivered according to the negotiation bandwidth negotiated by the AP and the STA. Instead, it is necessary to consider the transmission bandwidth upper limit that is of the STA and restricts the actual transmission bandwidth between the AP and the STA.

S103. The AP delivers a first MCS to the STA if the transmission bandwidth upper limit of the STA is less than a negotiation bandwidth negotiated by the AP and the STA, where the first MCS is less than an MCS that corresponds to the negotiation bandwidth negotiated by the AP and the STA and that is in a correspondence between a bandwidth and an MCS, and is greater than or equal to an MCS that corresponds to the transmission bandwidth upper limit of the STA and that is in the correspondence between a bandwidth and an MCS.

The correspondence between a bandwidth and an MCS reflects a correspondence between a negotiation bandwidth negotiated by the AP and the STA and an MCS delivered by the AP to the STA. At present, data transmission between an AP and a STA can be only based on several fixed MCSs, and which MCS is based on is determined by a negotiation bandwidth negotiated by the AP and the STA. Therefore, currently, a correspondence between a bandwidth and an MCS is preset, and then an MCS corresponding to the negotiation bandwidth negotiated by the AP and the STA is determined from the foregoing correspondence after the negotiation bandwidth negotiated by the AP and the STA is obtained using a rate adaptation algorithm or another manner. For example, an existing bandwidth control table is one presentation form of the foregoing correspondence. Herein, the foregoing correspondence may be a correspondence in a specific communications standard, for example, a correspondence in the Institute of Electrical and Electronics Engineers (IEEE) 802.11a/b/g/n/ac standard.

There may be multiple implementation manners of selecting, from the correspondence between a bandwidth and an MCS such as the bandwidth control table, an MCS corresponding to a bandwidth, which is not limited in this embodiment of the present disclosure. In the following, only one optional implementation manner is used as an example for description.

An MCS corresponding to a bandwidth may be an MCS corresponding to a bandwidth that is in the bandwidth control table and that is closest to and less than the bandwidth. For example, a bandwidth control table shown in Table 1 includes multiple MCSs, and each MCS corresponds to one specific bandwidth. If a negotiation bandwidth negotiated by an AP and a STA is 40 Megabits per second (Mbps), MCS4 corresponding to 39 Mbps, that is, a bandwidth that is closest to and less than 40 Mbps may be selected as a second MCS corresponding to the negotiation bandwidth negotiated by the AP and the STA.

TABLE 1

| MCS | Bandwidth (Mbps) |
| --- | --- |
| MCS 0 | 6.5 |
| MCS 1 | 13 |
| MCS 2 | 19.5 |
| MCS 3 | 26 |
| MCS 4 | 39 |
| MCS 5 | 52 |

In the prior art, the AP directly delivers the MCS corresponding to the negotiation bandwidth negotiated by the AP and the STA. The transmission bandwidth upper limit of the STA also restricts the actual transmission bandwidth between the AP and the STA, for example, when the MCS that corresponds to the transmission bandwidth upper limit of the STA and that is in the correspondence between a bandwidth and an MCS is less than the MSC corresponding to the negotiation bandwidth negotiated by the AP and the STA, it indicates that, in this case, an improperly high transmission bandwidth is caused if the MCS corresponding to the negotiation bandwidth negotiated by the AP and the STA is delivered. Therefore, it is necessary to reduce the delivered MCS, that is, the delivered MCS is less than the MCS corresponding to the negotiation bandwidth negotiated by the AP and the STA. However, to avoid a case in which an unlimited reduction of the MCS causes an excessively low bandwidth, which affects transmission efficiency, the reduced MCS needs to be greater than or equal to the MCS corresponding to the transmission bandwidth upper limit of the STA. An MCS selected based on this manner is more proper.

For convenience of understanding, the following provides a specific example for description. If the negotiation bandwidth negotiated by the AP and the STA is 40 Mbps and the transmission bandwidth upper limit of the STA is 20 Mbps, an MCS that corresponds to the negotiation bandwidth negotiated by the AP and the STA and that is selected from the bandwidth control table shown in Table 1 is MC4, and an MCS corresponding to the transmission bandwidth upper limit of the STA is MCS2. Because MCS2 is less than MCS4, in this step, the AP selects and delivers to the STA an MCS that is less than MCS4 and is greater than or equal to MCS2, that is, MCS2 or MCS3 to select a transmission bandwidth. For example, if MCS2 is selected for delivery, the transmission bandwidth between the AP and the STA is finally set to a bandwidth corresponding to MCS2, that is, 19.5 Mbps.

It should be noted that on the premise that an MCS that is finally used for delivery is greater than or equal to the MCS corresponding to the transmission bandwidth upper limit, a smaller MCS that is finally used for delivery is more helpful in resolving an improperly high transmission bandwidth problem. Therefore, in this step, the MCS corresponding to the transmission bandwidth upper limit of the STA is preferably selected and delivered to the STA.

It can be learned from the foregoing technical solutions that in this embodiment, during bandwidth selection, not only a negotiation bandwidth negotiated by an AP and a STA is considered, but also a transmission bandwidth upper limit of the STA is considered. When the transmission bandwidth upper limit of the STA is less than the negotiation bandwidth negotiated by the AP and the STA, it indicates that an improperly high transmission bandwidth is likely caused if a delivery is performed based on an MCS corresponding to the negotiation bandwidth negotiated by the AP and the STA. Therefore, a delivered MCS is reduced, and a first MCS is delivered to the STA, where the first MCS is less than the MCS that corresponds to the negotiation bandwidth negotiated by the AP and the STA and that is in a correspondence between a bandwidth and an MCS, and is greater than or equal to an MCS that corresponds to the transmission bandwidth upper limit and that is in the correspondence between a bandwidth and an MCS, thereby reducing a finally delivered MCS according to the transmission bandwidth upper limit of the STA in some scenarios of improperly high transmission bandwidths. Therefore, a delivered transmission bandwidth is reduced, power consumption of AP and STA side devices is reduced, and a standby time thereof is increased.

Actually, a rate adaptation algorithm in the prior art is already relatively mature, and the algorithm is also relatively complex. If the algorithm itself is changed, algorithm complexity is further increased, and a calculation amount increases, in addition, it is extremely difficult to predict a final bandwidth selection effect. However, in this embodiment, when the delivered transmission bandwidth is reduced, the existing rate adaptation algorithm is not changed. Therefore, this manner is simple and easy to perform without increasing the algorithm complexity and the calculation amount, can ensure the final bandwidth selection effect, and is applicable to any one of rate adaptation algorithms in the prior art.

In this embodiment of the present disclosure, in step S103, if the transmission bandwidth upper limit of the STA is greater than or equal to the negotiation bandwidth negotiated by the AP and the STA, that is, an improperly high transmission bandwidth problem will not occur, the MCS corresponding to the negotiation bandwidth negotiated by the AP and the STA is directly selected and delivered to the STA.

In this embodiment of the present disclosure, after MCS delivery is performed in step S103, the AP performs data transmission with the STA based on the first MCS delivered in this step. However, in the data transmission process, the MCS corresponding to the negotiation bandwidth negotiated by the AP and the STA may be updated, for example, when a channel status between the AP and the STA changes (for example, when the STA moves), the AP updates, according to a new channel status, the MCS corresponding to the negotiation bandwidth. In this case, the AP determines whether the MCS corresponding to the transmission bandwidth upper limit of the STA is less than an updated negotiation bandwidth, and if yes, the AP updates the first MCS and delivers an updated first MCS to the STA, where the updated first MCS is less than an MCS corresponding to the updated negotiation bandwidth, and is greater than or equal to the MCS corresponding to the transmission bandwidth upper limit of the STA.

It should be noted that in this embodiment of the present disclosure, the MCS corresponding to the transmission bandwidth upper limit of the STA may be also updated. To adapt to the update, steps S102 and S103 may be cyclically performed in this embodiment, or step S103 may be re-performed every time the MCS corresponding to the transmission bandwidth upper limit of the STA is updated to adjust the finally delivered bandwidth in real time.

In this embodiment of the present disclosure, respectively according to the negotiation bandwidth and the transmission bandwidth upper limit, corresponding MCSs may be determined from the correspondence between a bandwidth and an MCS after the AP obtains the negotiation bandwidth negotiated by the AP and the STA and the transmission bandwidth upper limit of the STA, a comparison between the negotiation bandwidth and the transmission bandwidth upper limit is implemented by comparing the MCSs. This case is described using an embodiment in the following.

Method Embodiment 2

Figure 2:
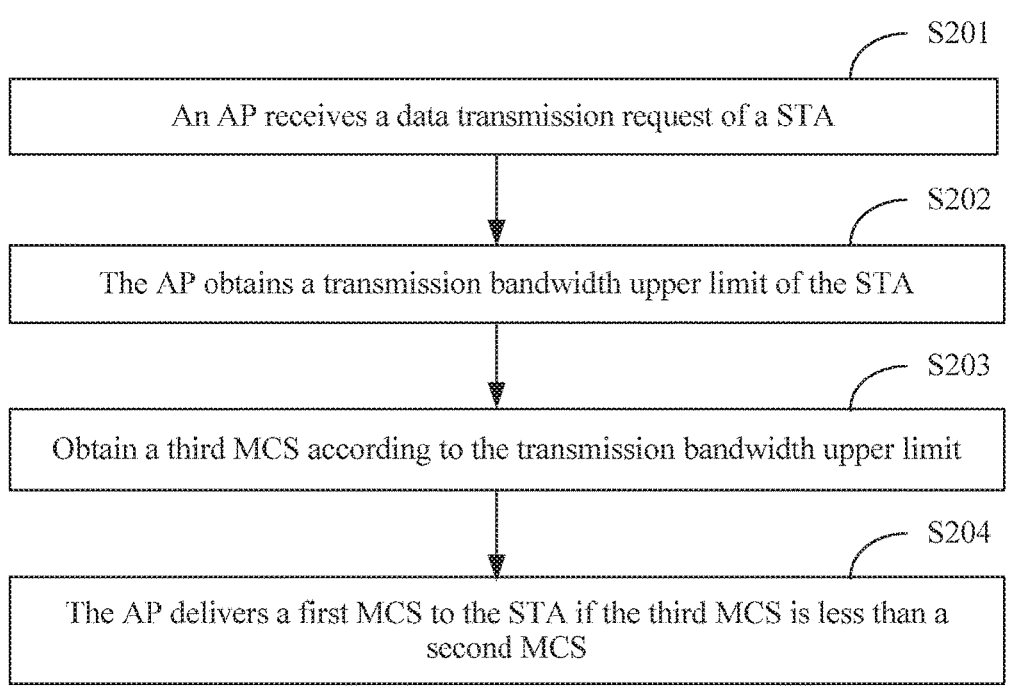
FIG. 2 is a specific flowchart of a second method embodiment according to an embodiment of the present disclosure.

Referring to FIG. 2, this embodiment of the present disclosure provides a second embodiment of a bandwidth selection method of the WiFi technology. In this embodiment, an AP obtains a negotiation bandwidth negotiated by the AP and a STA, and obtains a second MCS according to the negotiation bandwidth, where the second MCS is an MCS that corresponds to the negotiation bandwidth and that is in a correspondence between a bandwidth and an MCS.

The bandwidth control table shown in Table 1 is used as an example for description. If the negotiation bandwidth negotiated by the AP and the STA is 40 Mbps, MCS4 corresponding to 39 Mbps, that is, a bandwidth that is closest to and less than 40 Mbps, may be selected and used as the second MCS corresponding to 40 Mbps.

This embodiment includes the following steps:

S201. An AP receives a data transmission request of a STA.

The request may be sent by the STA, or may be sent by an uplink end of the AP.

S202. The AP obtains a transmission bandwidth upper limit of the STA.

In this embodiment of the present disclosure, the transmission bandwidth upper limit of the STA refers to a highest actual bandwidth that can be reached in a process of data transmission between the STA and the AP.

S203. Obtain a third MCS according to the transmission bandwidth upper limit, where the third MCS is an MCS that corresponds to the transmission bandwidth upper limit and that is in a correspondence between a bandwidth and an MCS.

The bandwidth control table shown in Table 1 is used as an example for description. If the transmission bandwidth upper limit of the STA is 20 Mbps, MCS2 corresponding to 19.5 Mbps, that is, a bandwidth that is closest to and less than 20 Mbps, may be selected and used as the third MCS corresponding to 20 Mbps.

S204. The AP delivers a first MCS to the STA if the third MCS is less than a second MCS, where the first MCS is less than the second MCS and is greater than or equal to the third MCS.

The second MCS is an MCS selected based on a rate negotiated by the AP and the STA, and the third MCS is an MCS selected based on the transmission bandwidth upper limit of the STA. In the prior art, the second MCS is directly delivered. However, the transmission bandwidth upper limit of the STA also restricts an actual transmission bandwidth between the AP and the STA, for example, when the third MCS is less than the second MCS, it indicates that in this case, an improperly high transmission bandwidth is caused if the second MCS is delivered. Therefore, it is necessary to reduce the delivered MCS and select the first MCS that is less than the second MCS and is greater than or equal to the third MCS for delivery.

For convenience of understanding, the following provides a specific example for description. If the negotiation bandwidth negotiated by the AP and the STA is 40 Mbps and the transmission bandwidth upper limit of the STA is 20 Mbps, the corresponding second MCS selected from the bandwidth control table shown in Table 1 is MC4, and the third MCS is MCS2. Because MCS2 is less than MCS4, in this step, an MCS that is less than MCS4 and is greater than or equal to MCS2, that is, MCS2 or MCS3, is selected and delivered to the STA to select a transmission bandwidth. For example, if MCS2 is selected for delivery, the transmission bandwidth between the AP and the STA is finally set to a bandwidth corresponding to MCS2, that is, 19.5 Mbps.

It should be noted that on the premise that an MCS that is finally used for delivery is greater than or equal to the third MCS, a smaller MCS that is finally used for delivery is more helpful in resolving an improperly high transmission bandwidth problem. Therefore, in this step, the third MCS is preferably selected and delivered to the STA.

It can be learned from the foregoing technical solutions that in this embodiment, during bandwidth selection, not only a negotiation bandwidth negotiated by an AP and a STA is considered, but also a transmission bandwidth upper limit of the STA is considered, and a second MCS and a third MCS are determined from a bandwidth control table respectively according to the negotiation bandwidth negotiated by the AP and the STA and the transmission bandwidth upper limit of the STA. When the third MCS is less than the second MCS, it indicates that an improperly high transmission bandwidth is caused if a delivery is performed based on the second MCS. Therefore, a delivered MCS is reduced, and a first MCS that is less than the second MCS and is greater than or equal to the third MCS is delivered to the STA, thereby reducing a finally delivered MCS according to the transmission bandwidth upper limit of the STA in some scenarios of improperly high transmission bandwidths. Therefore, a delivered transmission bandwidth is reduced, power consumption of AP and STA side devices is reduced, and a standby time thereof is increased.

Compared with the prior art, in this embodiment, not only the bandwidth that is negotiated by the AP and the STA and that is obtained according to a rate adaptation algorithm is considered, but also the transmission bandwidth upper limit of the STA is considered. The transmission bandwidth upper limit of the STA restricts the actual transmission bandwidth between the AP and the STA, where the transmission bandwidth upper limit of the STA may be obtained based on a transmission bandwidth of an uplink segment of the AP In some cases, in different transmission systems, correspondences between a bandwidth and an MCS are different. Therefore, in this embodiment, during obtaining of the second MCS, the second MCS may be selected from an MCS corresponding to a transmission system. The transmission system may be determined by at least one of the following parameters a channel frequency resource, an on/off state of a short guard interval, or an input/output (I/O) mode. The following provides an example for description.

For example, in a bandwidth control table shown in Table 2, a transmission system includes a channel frequency resource, an on/off state of a short guard interval, and an I/O mode. The channel frequency resource includes two types a 20 Megahertz (MHz) channel frequency resource and a 40 MHz channel frequency resource, the on/off state of the short guard interval includes two types an off short guard interval and an on short guard interval, and the I/O mode includes two types Single Input Single Output (SISO) and 2×2 Multiple Input Multiple Output (MIMO). Therefore, before the second MCS corresponding to the negotiation bandwidth is obtained, first, it is necessary to determine a corresponding transmission system. For example, when the negotiation bandwidth is 40 MHz, the channel frequency resource is 20 MHz, the short guard interval is off, and the I/O mode is SISO, MCS4 is determined, from the corresponding transmission system, as an MCS corresponding 40 MHz.

TABLE 2

| | | 20 MHz channel frequency resource | | | 40 MHz channel frequency resource | | |
|---|---|---|---|---|---|---|---|
| | | SISO | | 2 × 2MIMO | | SISO | 2 × 2MIMO |
| Off short guard interval | MCS0 | 6.5 | MCS0 | 13 | MCS0 | 13.5 | MCS0 | 27 |
| | MCS1 | 13 | MCS1 | 26 | MCS1 | 27 | MCS1 | 54 |
| | MCS2 | 19.5 | MCS2 | 39 | MCS2 | 40.5 | MCS2 | 81 |
| | MCS3 | 26 | MCS3 | 52 | MCS3 | 54 | MCS3 | 108 |
| | MCS4 | 39 | MCS4 | 78 | MCS4 | 80 | MCS4 | 162 |
| | MCS5 | 52 | MCS5 | 104 | MCS5 | 108 | MCS5 | 216 |
| On short guard interval | MCS0 | 7.2 | MCS0 | 14.4 | MCS0 | 15 | MCS0 | 30 |
| | MCS1 | 14.4 | MCS1 | 28.9 | MCS1 | 30 | MCS1 | 60 |
| | MCS2 | 21.7 | MCS2 | 43.3 | MCS2 | 45 | MCS2 | 90 | and/or a required transmission bandwidth of the STA. The following provides a detailed description using an embodiment.

Method Embodiment 3

Figure 3:
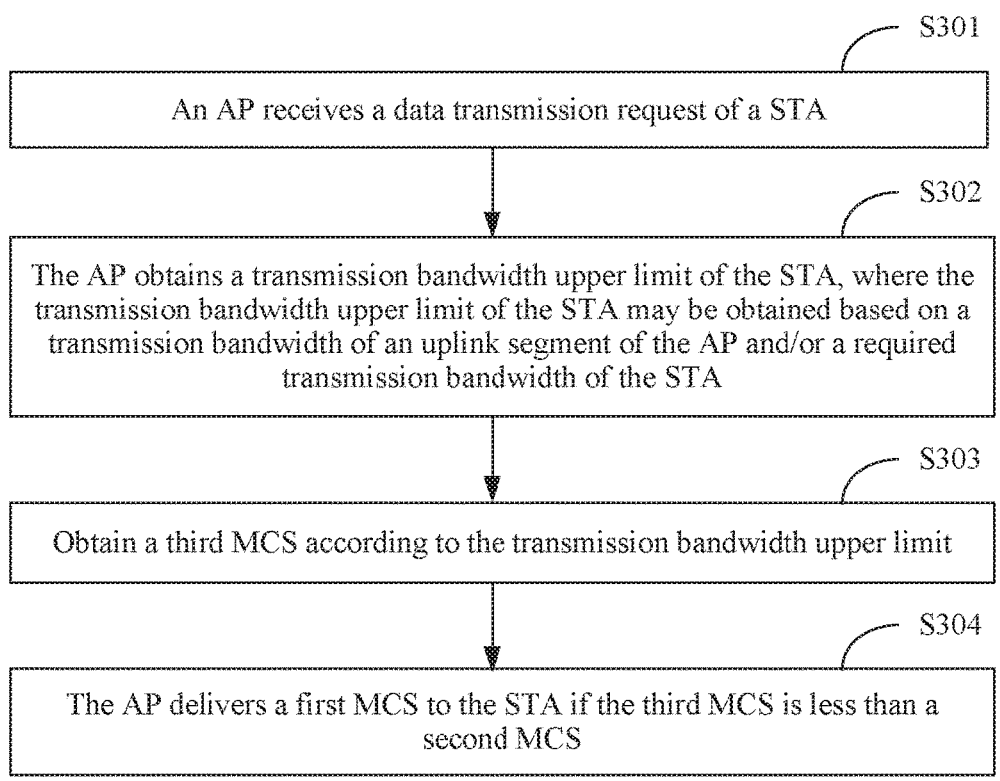
FIG. 3 is a specific flowchart of a third method embodiment according to an embodiment of the present disclosure.

Referring to FIG. 3, this embodiment of the present disclosure provides a third embodiment of a bandwidth selection method of the WiFi technology, and this embodiment focuses on describing a manner of obtaining a transmission bandwidth upper limit of a STA. It should be noted that in this embodiment, in the description of the manner of obtaining the transmission bandwidth upper limit of the STA, a scenario corresponding to the second method embodiment is used as an example. Actually, the manner of obtaining the transmission bandwidth upper limit of the STA in this embodiment may be further applied to another embodiment provided in this embodiment of the present disclosure.

In this embodiment, an AP obtains, according to a manner such as a rate adaptation algorithm, a negotiation bandwidth negotiated by the AP and the STA, and obtains a second MCS according to the negotiation bandwidth, where the second MCS is an MCS that corresponds to the negotiation bandwidth and that is in a correspondence between a bandwidth and an MCS.

This embodiment includes the following steps:

S301. An AP receives a data transmission request of a STA.

The request may be sent by the STA, or may be sent by an uplink end of the AP.

S302. The AP obtains a transmission bandwidth upper limit of the STA.

In this embodiment of the present disclosure, the transmission bandwidth upper limit of the STA may be obtained based on a transmission bandwidth of an uplink segment of the AP and/or a required transmission bandwidth of the STA. The following provides a description using three separate cases.

Case 1: The transmission bandwidth upper limit of the STA is obtained based on the transmission bandwidth of the uplink segment of the AP.

The transmission bandwidth of the uplink segment of the AP refers to a transmission bandwidth negotiated when data is transmitted over the uplink segment of the AP. At present, when the AP performs uplink segment data transmission, generally, an uplink end (WAN side or LAN side) of the AP obtains channel quality between the uplink end of the AP and the AP, and negotiates the transmission bandwidth between the AP and the uplink end according to the channel quality.

In this embodiment of the present disclosure, although final implementation is that the AP delivers a bandwidth to the STA, that is, bandwidth selection of a downlink segment of the AP, because the AP needs to obtain a resource from the uplink segment to implement data transfer with the downlink segment, a transmission bandwidth of the uplink segment also restricts a transmission bandwidth of the downlink segment. However, in the prior art, bandwidth selection is separately performed on the uplink segment and the downlink segment, therefore, bandwidth selection of the downlink segment is only based on channel quality of the downlink segment without considering a related condition of the uplink segment. Factors considered are not comprehensive in this manner.

In this embodiment of the present disclosure, during bandwidth selection of the downlink segment, the transmission bandwidth of the uplink end may be considered, for example, the transmission bandwidth of the uplink segment of the AP may be directly used as the transmission bandwidth upper limit of the STA. A specific manner of obtaining the transmission bandwidth of the uplink segment of the AP is not limited in this embodiment of the present disclosure. In the following, only several feasible manners are used as an example for description.

The manner of obtaining the transmission bandwidth of the uplink segment of the AP may include The AP obtains a size of a resource block allocated to the uplink segment of the AP, and the AP obtains the transmission bandwidth of the uplink segment of the AP according to a size of the resource block. This manner may be applied to a case in which the uplink end is the WAN side. When the AP receives the data transmission request of the STA, the WAN side also needs to deliver a transmission rate to the AP, therefore, the WAN side allocates a resource block to the AP according to a channel status between the WAN side and the AP, and the transmission bandwidth of the uplink segment of the AP can be calculated according to a size of the allocated resource block. The size of the resource block may be directly read from a modem.

The transmission bandwidth of the uplink segment of the AP may be further obtained in a manner of speed testing, and this manner may be applied to a case in which the uplink end is the WAN or LAN side. For example, by installing test software on the uplink segment of the AP or according to a test website, an actual transmission rate of the uplink segment of the AP can be obtained and used as the transmission bandwidth of the uplink segment of the AP.

Case 2: The transmission bandwidth upper limit of the STA is obtained based on the required transmission bandwidth of the STA.

In the prior art, bandwidth delivery is implemented according to a rate adaptation algorithm, where an input parameter of the rate adaptation algorithm is channel quality between an AP and a STA, such as an RSSI, a PSR, a PER, and another parameter, and a specific bandwidth requirement, that is, a required transmission bandwidth of the STA, is not considered when the STA transmits data. Factors considered are not comprehensive in this manner.

In this embodiment of the present disclosure, the required transmission bandwidth of the STA may be directly used as the transmission bandwidth upper limit of the STA. A specific manner of obtaining the required transmission bandwidth of the STA is not limited in this embodiment of the present disclosure. The following uses only one feasible manner as an example for description.

The manner of obtaining the required transmission bandwidth of the STA may include The AP obtains a service type of transmission data from the data transmission request, and the AP obtains the required transmission bandwidth of the STA based on the service type. When the AP receives the data transmission request, generally, the request includes a service type of transmission data of the STA, for example, the service type is video, picture, or text data, and if the service type is video data, the video data is a high-definition video or a standard definition video. The required transmission bandwidth can be calculated according to the service type.

Case 3: The transmission bandwidth upper limit of the STA is obtained based on the transmission bandwidth of the uplink segment of the AP and the required transmission bandwidth of the STA.

In this case, generally, the lower bandwidth of the transmission bandwidth of the uplink segment of the AP and the required transmission bandwidth of the STA is used as the transmission bandwidth upper limit of the STA. For example, if the transmission bandwidth of the uplink segment of the AP is 25 Mbps and the required transmission bandwidth of the STA is 20 Mbps, the transmission bandwidth upper limit of the STA is finally determined as 20 Mbps.

For a specific manner of obtaining the transmission bandwidth of the uplink segment of the AP and a specific manner of obtaining the required transmission bandwidth of the STA, respectively refer to case 1 and case 2, details are not described herein any further.

S303. Obtain a third MCS according to the transmission bandwidth upper limit, where the third MCS is an MCS that corresponds to the transmission bandwidth upper limit and that is in a correspondence between a bandwidth and an MCS.

Similar to the process of selecting the second MCS, in this step, during selection of the third MCS, the third MCS may be also selected from an MCS corresponding to a transmission system. For a specific process, refer to the process of selecting the second MCS.

S304. The AP delivers a first MCS to the STA if the third MCS is less than a second MCS, where the first MCS is less than the second MCS and is greater than or equal to the third MCS.

In this step, the AP preferably delivers the third MCS.

It can be learned from the foregoing technical solutions that in this embodiment, several optional manners of obtaining a transmission bandwidth upper limit of a STA are described. In this embodiment of the present disclosure, the manner of obtaining the transmission bandwidth upper limit is not limited to the several implementation manners provided in this embodiment.

In the foregoing two embodiments, during implementation of bandwidth selection, not only a negotiation bandwidth negotiated by an AP and a STA is considered, but also a transmission bandwidth upper limit of the STA is considered, thereby resolving an improperly high transmission bandwidth problem. In specific implementation, corresponding MCSs are first selected based on the foregoing two bandwidths, and then the MCSs are compared to determine a finally delivered MCS. However, actually, the foregoing two bandwidths may be compared first, and the finally delivered MCS is determined according to a comparison result. The following provides an embodiment for description.

Method Embodiment 4

Figure 4:
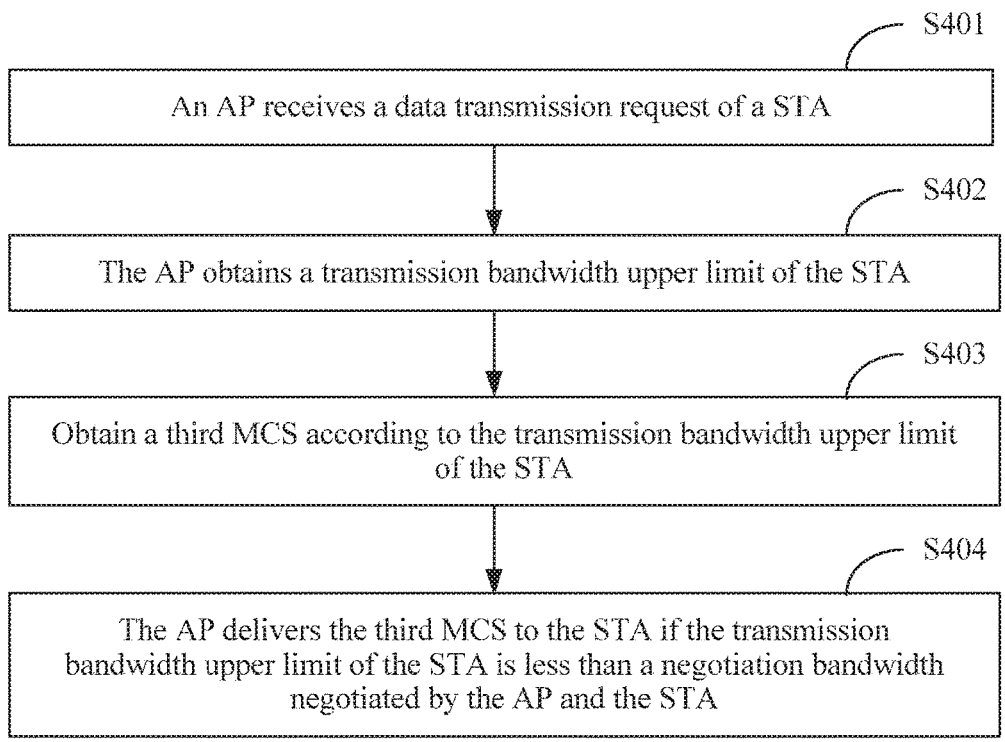
FIG. 4 is a specific flowchart of a fourth method embodiment according to an embodiment of the present disclosure.

Referring to FIG. 4, this embodiment of the present disclosure provides a fourth embodiment of a bandwidth selection method of the WiFi technology, and in this embodiment, an AP obtains a negotiation bandwidth negotiated by the AP and a STA.

In this embodiment, that the AP obtains the negotiation bandwidth negotiated by the AP and the STA may take place when the AP establishes a channel to the STA for the first time, or a channel status between the AP and the STA changes, for example, when the STA moves. Herein, the AP may obtain, according to a rate adaptation algorithm, the negotiation bandwidth negotiated by the AP and the STA.

This embodiment includes the following steps:

S401. An AP receives a data transmission request of a STA.

The request may be sent by the STA, or may be sent by an uplink end of the AP.

S402. The AP obtains a transmission bandwidth upper limit of the STA.

In this embodiment of the present disclosure, the transmission bandwidth upper limit of the STA refers to a highest actual bandwidth that can be reached in a process of data transmission between the STA and the AP.

S403. Obtain a third MCS according to the transmission bandwidth upper limit of the STA, where the third MCS is an MCS that corresponds to the transmission bandwidth upper limit of the STA and that is in a correspondence between a bandwidth and an MCS.

The correspondence between a bandwidth and an MCS reflects a correspondence between a negotiation bandwidth negotiated by the AP and the STA and an MCS delivered by the AP to the STA. One presentation form of the correspondence is an existing bandwidth control table.

S404. The AP delivers the third MCS to the STA if the transmission bandwidth upper limit of the STA is less than the negotiation bandwidth negotiated by the AP and the STA.

It should be noted that in this embodiment, step S403 may be not performed until the transmission bandwidth upper limit of the STA is less than the negotiation bandwidth negotiated by the AP and the STA.

Unlike the second method embodiment in which corresponding MCSs are first selected according to the foregoing two bandwidths and then the MCSs are compared, in this embodiment, the foregoing two bandwidths are compared first, and if the transmission bandwidth upper limit of the STA is less than the negotiation bandwidth negotiated by the AP and the STA, it indicates that in this case, a case of an improperly high transmission bandwidth may occur, therefore, the MCS corresponding to the lower bandwidth of the foregoing two bandwidths, that is, the transmission bandwidth upper limit of the STA, is selected and delivered to the STA, which can also avoid the case of an improperly high transmission bandwidth.

For convenience of understanding, the following provides a specific example for description. In the bandwidth control table shown in Table 1, if the negotiation bandwidth negotiated by the AP and the STA is 40 Mbps and the transmission bandwidth upper limit of the STA is 20 Mbps, where, the transmission bandwidth upper limit of the STA is less than the negotiation bandwidth negotiated by the AP and the STA, MCS2 corresponding to the transmission bandwidth upper limit of the STA, that is, 20 Mbps, is selected to perform bandwidth delivery.

It should be noted that for a similarity between this embodiment and the first method embodiment to the third method embodiment, refer to the foregoing three embodiments, details are not described herein any further.

It can be learned from the foregoing technical solutions that in this embodiment, during bandwidth selection, not only an obtained bandwidth negotiated by an AP and a STA is considered, but also a transmission bandwidth upper limit of the STA is considered. When the transmission bandwidth upper limit of the STA is less than the negotiation bandwidth negotiated by the AP and the STA, an MCS corresponding to the transmission bandwidth upper limit of the STA that is lower is selected for delivery, thereby reducing a finally delivered MCS according to the transmission bandwidth upper limit in some scenarios of improperly high transmission bandwidths. Therefore, a delivered transmission bandwidth is reduced, power consumption of AP and STA side devices is reduced, and a standby time thereof is increased.

It should be noted that when the transmission bandwidth upper limit of the STA is less than the negotiation bandwidth negotiated by the AP and the STA, a transmission bandwidth is not necessarily improperly high, for example, in this case, both the transmission bandwidth upper limit of the STA and the negotiation bandwidth negotiated by the AP and the STA may be corresponding to a same MCS. However, provided that the MCS corresponding to the transmission bandwidth upper limit of the STA that is lower is selected for bandwidth delivery, a case of an improperly high bandwidth can be definitely avoided.

In this embodiment of the present disclosure, in step S403, if the transmission bandwidth upper limit of the STA is greater than or equal to the negotiation bandwidth negotiated by the AP and the STA, that is, an improperly high transmission bandwidth problem will not occur, therefore, the AP selects and delivers, from the bandwidth control table to the STA, an MCS corresponding to the negotiation bandwidth negotiated by the AP and the STA.

In this embodiment, not only the negotiation bandwidth negotiated by the AP and the STA is considered, but also the transmission bandwidth upper limit of the STA is considered. The transmission bandwidth upper limit of the STA restricts an actual transmission bandwidth between the AP and the STA, where the transmission bandwidth upper limit of the STA may be obtained based on a transmission bandwidth of an uplink segment of the AP and/or a required transmission bandwidth of the STA, for a specific obtaining manner, refer to a related part of the third method embodiment, details are not described herein any further.

In this embodiment, selecting the MCS corresponding to the transmission bandwidth upper limit of the STA may be selecting an MCS corresponding to a bandwidth that is closest to and less than the bandwidth upper limit. In addition, the MCS may be selected from an MCS corresponding to a transmission system. The transmission system may be determined based on at least one of the following parameters a downlink segment channel frequency, an on/off state of a short guard interval, or an I/O mode, for details, refer to a related part of the first embodiment and the third embodiment of the bandwidth selection method, details are not described herein any further.

The foregoing describes embodiments of a bandwidth selection method in embodiments of the present disclosure, and the following describes embodiments of an AP in embodiments of the present disclosure from a hardware processing perspective.

Apparatus Embodiment 1

Figure 5:
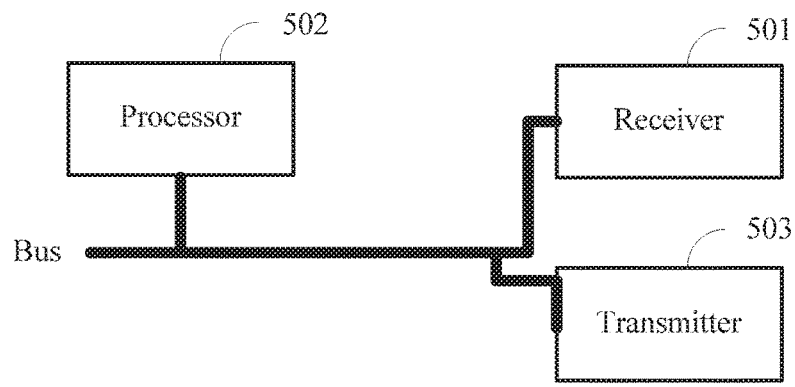
FIG. 5 is a schematic structural diagram of a first AP embodiment according to an embodiment of the present disclosure.

Referring to FIG. 5, this embodiment of the present disclosure provides a first embodiment of an AP, and the AP in this embodiment includes a receiver 501, a processor 502, and a transmitter 503.

The transmitter 503 is connected to the processor 502, and the receiver 501 is connected to the processor 502. The processor 502 may be connected to the transmitter 503 and the receiver 501 using a bus or in another manner. In FIG. 5, a connection using a bus is used as an example.

The receiver 501 is configured to receive a data transmission request of a STA.

When the STA needs to access a network to transmit data, the receiver 501 receives the data transmission request of the STA. The request may be sent by the STA, for example, the STA sends a data transmission request to the receiver 501 when a STA side user taps play a video, or the request may be sent by an uplink end of the AP, for example, when a WAN side or a LAN side needs to push data to the STA, the WAN side or the LAN side sends a data transmission request of the STA to the receiver 501.

The processor 502 is configured to obtain a negotiation bandwidth negotiated by the STA, and obtain a transmission bandwidth upper limit of the STA after the receiver 501 receives the data transmission request.

In this embodiment, that the processor 502 obtains the negotiation bandwidth negotiated by the AP and the STA may take place when the AP establishes a channel to the STA for the first time, or a channel status between the AP and the STA changes, for example, when the STA moves. Herein, the processor 502 may obtain, according to a rate adaptation algorithm, the negotiation bandwidth negotiated by the AP and the STA.

In this embodiment of the present disclosure, the transmission bandwidth upper limit of the STA refers to a highest actual bandwidth that can be reached in a process of data transmission between the STA and the AP. Through studying, the inventor finds that in some application scenarios, the transmission bandwidth upper limit of the STA imposes a limitation on an actual transmission bandwidth. For example, if the transmission bandwidth upper limit of the STA is less than a negotiation bandwidth negotiated by the AP and the STA, it is likely that an actual transmission bandwidth between the AP and the STA cannot reach a transmission bandwidth selected based on an existing rate adaptation algorithm, thereby causing an improperly high transmission bandwidth problem. Therefore, in this embodiment, after the data transmission request of the STA is received, a bandwidth is not directly delivered according to the negotiation bandwidth negotiated by the AP and the STA. Instead, it is necessary to consider the transmission bandwidth upper limit that is of the STA and restricts the actual transmission bandwidth between the AP and the STA.

The transmitter 503 is configured to deliver a first MCS to the STA if the processor 502 determines that the transmission bandwidth upper limit is less than the negotiation bandwidth, where the first MCS is less than an MCS that corresponds to the negotiation bandwidth and that is in a correspondence between a bandwidth and an MCS, and is greater than or equal to an MCS that corresponds to the transmission bandwidth upper limit and that is in the correspondence between a bandwidth and an MCS.

The correspondence between a bandwidth and an MCS reflects a correspondence between a negotiation bandwidth negotiated by the AP and the STA and an MCS delivered by the AP to the STA. At present, data transmission between an AP and a STA can be only based on several fixed MCSs, and which MCS is based on is determined by a negotiation bandwidth negotiated by the AP and the STA. Therefore, currently, a correspondence between a bandwidth and an MCS is preset, and then an MCS corresponding to the negotiation bandwidth negotiated by the AP and the STA is determined from the foregoing correspondence after the negotiation bandwidth negotiated by the AP and the STA is obtained using a rate adaptation algorithm or another manner. For example, an existing bandwidth control table is one presentation form of the foregoing correspondence. Herein, the foregoing correspondence may be a correspondence in a specific communications standard, for example, a correspondence in the IEEE 802.11a/b/g/n/ac standard.

There may be multiple implementation manners of selecting, from the correspondence between a bandwidth and an MCS such as the bandwidth control table, an MCS corresponding to a bandwidth, which is not limited in this embodiment of the present disclosure. In the following, only one optional implementation manner is used as an example for description. An MCS corresponding to a bandwidth may be an MCS corresponding to a bandwidth that is in the bandwidth control table and that is closest to and less than the bandwidth.

In the prior art, the transmitter 503 directly delivers the MCS corresponding to the negotiation bandwidth negotiated by the AP and the STA. The transmission bandwidth upper limit of the STA also restricts the actual transmission bandwidth between the AP and the STA, for example, when the MCS that corresponds to the transmission bandwidth upper limit of the STA and that is in the correspondence between a bandwidth and an MCS is less than the MSC corresponding to the negotiation bandwidth negotiated by the AP and the STA, it indicates that, in this case, an improperly high transmission bandwidth is caused if the MCS corresponding to the negotiation bandwidth negotiated by the AP and the STA is delivered. Therefore, it is necessary to reduce the delivered MCS, that is, the delivered MCS is less than the MCS corresponding to the negotiation bandwidth negotiated by the AP and the STA. However, to avoid a case in which an unlimited reduction of the MCS causes an excessively low bandwidth, which affects transmission efficiency, the reduced MCS needs to be greater than or equal to the MCS corresponding to the transmission bandwidth upper limit of the STA. An MCS selected based on this manner is more proper.

For convenience of understanding, the following provides a specific example for description. If the negotiation bandwidth negotiated by the AP and the STA is 40 Mbps and the transmission bandwidth upper limit of the STA is 20 Mbps, an MCS that corresponds to the negotiation bandwidth negotiated by the AP and the STA and that is selected from the bandwidth control table shown in Table 1 is MC4, and an MCS corresponding to the transmission bandwidth upper limit of the STA is MCS2. Because MCS2 is less than MCS4, the transmitter 503 delivers, to the STA, an MCS that is less than MCS4 and is greater than or equal to MCS2, that is, MCS2 or MCS3 to select a transmission bandwidth. For example, if MCS2 is selected for delivery, the transmission bandwidth between the AP and the STA is finally set to a bandwidth corresponding to MCS2, that is, 19.5 Mbps.

It should be noted that on the premise that an MCS that is finally used for delivery is greater than or equal to the MCS corresponding to the transmission bandwidth upper limit, a smaller MCS that is finally used for delivery is more helpful in resolving an improperly high transmission bandwidth problem. Therefore, the transmitter 503 preferably selects and delivers the MCS corresponding to the transmission bandwidth upper limit of the STA to the STA.

It can be learned from the foregoing technical solutions that in this embodiment, during bandwidth selection, not only a negotiation bandwidth negotiated by an AP and a STA is considered, but also a transmission bandwidth upper limit of the STA is considered. When the transmission bandwidth upper limit of the STA is less than the negotiation bandwidth negotiated by the AP and the STA, it indicates that an improperly high transmission bandwidth is likely caused if a delivery is performed based on an MCS corresponding to the negotiation bandwidth negotiated by the AP and the STA. Therefore, a delivered MCS is reduced, and a first MCS is delivered to the STA, where the first MCS is less than the MCS that corresponds to the negotiation bandwidth negotiated by the AP and the STA and that is in a correspondence between a bandwidth and an MCS, and is greater than or equal to an MCS that corresponds to the transmission bandwidth upper limit and that is in the correspondence between a bandwidth and an MCS, thereby reducing a finally delivered MCS according to the transmission bandwidth upper limit of the STA in some scenarios of improperly high transmission bandwidths. Therefore, a delivered transmission bandwidth is reduced, power consumption of AP and STA side devices is reduced, and a standby time thereof is increased.

However, in this embodiment, when the delivered transmission bandwidth is reduced, the existing rate adaptation algorithm is not changed. Therefore, this manner is simple and easy to perform without increasing algorithm complexity and a calculation amount, can ensure a final bandwidth selection effect, and is applicable to any one of rate adaptation algorithms in the prior art.

In this embodiment of the present disclosure, the processor 502 may be a central processing unit central processing unit (CPU), an Application Specific Integrated Circuit (ASIC), or one or more integrated circuits configured to implement this embodiment of the present application. This embodiment of the present disclosure may further include a memory, and the memory is configured to store a program. The memory may include a high-speed random access memory (RAM), and may further include a non-volatile memory, for example, at least one disk memory.

In this embodiment of the present disclosure, if the processor 502 determines that the transmission bandwidth upper limit of the STA is greater than or equal to the negotiation bandwidth negotiated by the AP and the STA, that is, an improperly high transmission bandwidth problem will not occur, the transmitter 503 directly selects and delivers the MCS corresponding to the negotiation bandwidth negotiated by the AP and the STA to the STA.

In this embodiment of the present disclosure, after the transmitter 503 performs MCS delivery, the transmitter 503 and the receiver 501 perform data transmission with the STA based on the delivered first MCS. However, in the data transmission process, the MCS corresponding to the negotiation bandwidth negotiated by the AP and the STA may be updated, for example, when the channel status between the AP and the STA changes (for example, when the STA moves), the processor 502 updates, according to a new channel status, the MCS corresponding to the negotiation bandwidth. In this case, the processor 502 determines whether the MCS corresponding to the transmission bandwidth upper limit of the STA is less than an updated negotiation bandwidth, and if yes, the processor 502 updates the first MCS and instructs the transmitter 503 to deliver an updated first MCS to the STA, where the updated first MCS is less than an MCS corresponding to the updated negotiation bandwidth, and is greater than or equal to the MCS corresponding to the transmission bandwidth upper limit of the STA.

It should be noted that in this embodiment of the present disclosure, the MCS corresponding to the transmission bandwidth upper limit of the STA may be also updated, and to adapt to the update, the processor 502 and the transmitter 503 may cyclically perform obtaining of the transmission bandwidth upper limit of the STA and delivering of the first MCS, or the transmitter 503 may re-deliver the first MCS every time the MCS corresponding to the transmission bandwidth upper limit of the STA is updated, thereby adjusting a finally delivered bandwidth in real time.

In this embodiment of the present disclosure, respectively according to the negotiation bandwidth and the transmission bandwidth upper limit, corresponding MCSs may be determined from the correspondence between a bandwidth and an MCS after the AP obtains the negotiation bandwidth negotiated by the AP and the STA and the transmission bandwidth upper limit of the STA, a comparison between the negotiation bandwidth and the transmission bandwidth upper limit is implemented by comparing the MCSs. This case is described using an embodiment in the following.

Apparatus Embodiment 2

Figure 6:
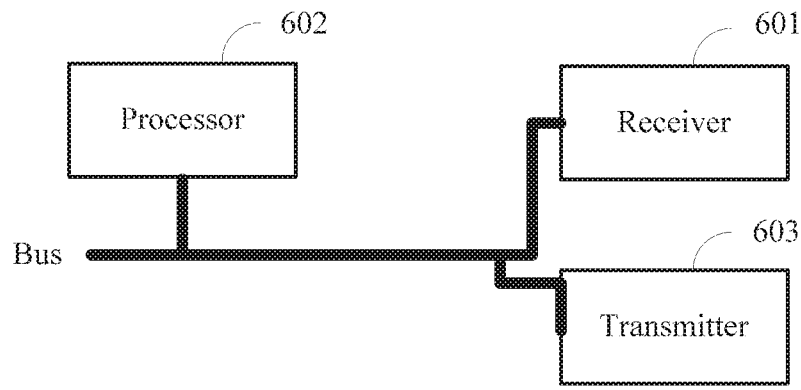
FIG. 6 is a schematic structural diagram of a second AP embodiment according to an embodiment of the present disclosure.

Referring to FIG. 6, this embodiment of the present disclosure provides a second embodiment of an AP, and the AP in this embodiment includes a receiver 601, a processor 602, and a transmitter 603.

The transmitter 603 is connected to the processor 602, and the receiver 601 is connected to the processor 602.

The receiver 601 is configured to receive a data transmission request of a STA.

The request may be sent by the STA, or may be sent by an uplink end of the AP.

The processor 602 is configured to obtain a negotiation bandwidth negotiated by the AP and the STA, and obtain a second MCS according to the negotiation bandwidth, and obtain a transmission bandwidth upper limit of the STA after the receiver 601 receives the data transmission request, and obtain a third MCS according to the transmission bandwidth upper limit. The second MCS is an MCS that corresponds to the negotiation bandwidth and that is in a correspondence between a bandwidth and an MCS, and the third MCS is an MCS that corresponds to the transmission bandwidth upper limit and that is in the correspondence between a bandwidth and an MCS.

In this embodiment, that the processor 602 obtains the negotiation bandwidth negotiated by the AP and the STA may take place when the AP establishes a channel to the STA for the first time, or a channel status between the AP and the STA changes, for example, when the STA moves. Herein, the processor 602 may obtain, according to a rate adaptation algorithm, the negotiation bandwidth negotiated by the AP and the STA.

The bandwidth control table shown in Table 1 is used as an example for description. If the negotiation bandwidth negotiated by the AP and the STA is 40 Mbps, MCS4 corresponding to 39 Mbps, that is, a bandwidth that is closest to and less than 40 Mbps, may be selected and used as the second MCS corresponding to 40 Mbps. If the transmission bandwidth upper limit of the STA is 20 Mbps, MCS2 corresponding to 19.5 Mbps, that is, a bandwidth that is closest to and less than 20 Mbps, may be selected and used as the third MCS corresponding to 20 Mbps.

The transmitter 603 is configured to deliver a first MCS to the STA if the processor 602 determines that the third MCS is less than the second MCS. The first MCS is less than the second MCS and is greater than or equal to the third MCS.

The second MCS is an MCS selected based on a rate negotiated by the AP and the STA, and the third MCS is an MCS selected based on the transmission bandwidth upper limit of the STA. In the prior art, the second MCS is directly delivered. However, the transmission bandwidth upper limit of the STA also restricts an actual transmission bandwidth between the AP and the STA, for example, when the third MCS is less than the second MCS, it indicates that in this case, an improperly high transmission bandwidth is caused if the second MCS is delivered. Therefore, it is necessary to reduce the delivered MCS and select the first MCS that is less than the second MCS and is greater than or equal to the third MCS for delivery.

It should be noted that on the premise that an MCS that is finally used for delivery is greater than or equal to the third MCS, a smaller MCS that is finally used for delivery is more helpful in resolving an improperly high transmission bandwidth problem. Therefore, the transmitter 603 preferably selects and delivers the third MCS to the STA.

It can be learned from the foregoing technical solutions that in this embodiment, during bandwidth selection, not only a negotiation bandwidth negotiated by an AP and a STA is considered, but also a transmission bandwidth upper limit of the STA is considered, and a second MCS and a third MCS are determined respectively according to the negotiation bandwidth negotiated by the AP and the STA and the transmission bandwidth upper limit of the STA. When the third MCS is less than the second MCS, it indicates that an improperly high transmission bandwidth is caused if a delivery is performed based on the second MCS. Therefore, a delivered MCS is reduced, and a first MCS that is less than the second MCS and is greater than or equal to the third MCS is delivered to the STA, thereby reducing a finally delivered MCS according to the transmission bandwidth upper limit of the STA in some scenarios of improperly high transmission bandwidths. Therefore, a delivered transmission bandwidth is reduced, power consumption of AP and STA side devices is reduced, and a standby time thereof is increased.

In this embodiment, during implementation of bandwidth selection, not only a negotiation bandwidth negotiated by an AP and a STA is considered, but also a transmission bandwidth upper limit of the STA is considered, thereby resolving an improperly high transmission bandwidth problem. In specific implementation, corresponding MCSs are first selected based on the foregoing two bandwidths, and then the MCSs are compared to determine a finally delivered MCS. However, actually, the foregoing two bandwidths may be compared first, and the finally delivered MCS is determined according to a comparison result. The following provides an embodiment for description.

Apparatus Embodiment 3

Figure 7:
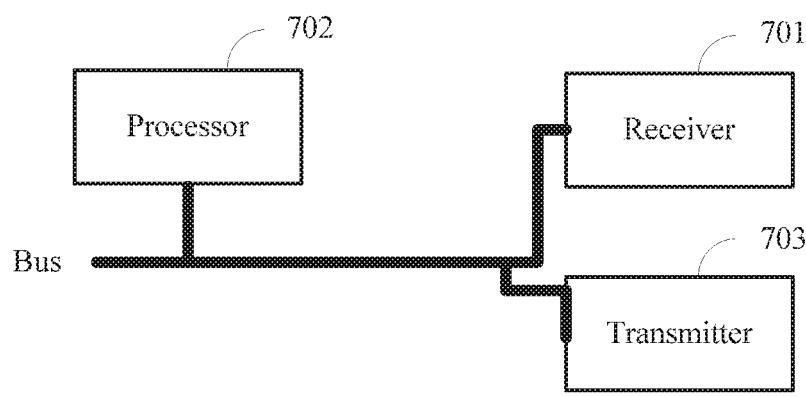
FIG. 7 is a schematic structural diagram of a third AP embodiment according to an embodiment of the present disclosure.

Referring to FIG. 7, this embodiment of the present disclosure provides a third embodiment of an AP, and the AP in this embodiment includes a receiver 701, a processor 702, and a transmitter 703.

The transmitter 703 is connected to the processor 702, and the receiver 701 is connected to the processor 702.

The receiver 701 is configured to receive a data transmission request of a STA.

The request may be sent by the STA, or may be sent by an uplink end of the AP.

The processor 702 is configured to obtain a negotiation bandwidth negotiated by the AP and the STA, and obtain a transmission bandwidth upper limit of the STA after the receiver 701 receives the data transmission request, and obtain a third MCS according to the transmission bandwidth upper limit, where the third MCS is an MCS that corresponds to the transmission bandwidth upper limit and that is in a correspondence between a bandwidth and an MCS.

In this embodiment, that the processor 702 obtains the negotiation bandwidth negotiated by the AP and the STA may take place when the AP establishes a channel to the STA for the first time, or a channel status between the AP and the STA changes, for example, when the STA moves. Herein, the processor 702 may obtain, according to a rate adaptation algorithm, the negotiation bandwidth negotiated by the AP and the STA.

The correspondence between a bandwidth and an MCS reflects a correspondence between a negotiation bandwidth negotiated by the AP and the STA and an MCS delivered by the AP to the STA. One presentation form of the correspondence is an existing bandwidth control table.

The transmitter 703 is configured to deliver the third MCS to the STA if the transmission bandwidth upper limit of the STA is less than the negotiation bandwidth negotiated by the AP and the STA.

Unlike the second apparatus embodiment in which corresponding MCSs are first selected according to the foregoing two bandwidths and then the MCSs are compared, in this embodiment, the foregoing two bandwidths are compared first, and if the transmission bandwidth upper limit of the STA is less than the negotiation bandwidth negotiated by the AP and the STA, it indicates that in this case, a case of an improperly high transmission bandwidth may occur. Therefore, the MCS corresponding to the lower bandwidth of the foregoing two bandwidths, that is, the transmission bandwidth upper limit of the STA, is selected and delivered to the STA, which can also avoid a case of an improperly high transmission bandwidth.

It can be learned from the foregoing technical solutions that in this embodiment, during bandwidth selection, not only an obtained bandwidth negotiated by an AP and a STA is considered, but also a transmission bandwidth upper limit of the STA is considered. When the transmission bandwidth upper limit of the STA is less than the negotiation bandwidth negotiated by the AP and the STA, an MCS corresponding to the transmission bandwidth upper limit of the STA that is lower is selected for delivery, thereby reducing a finally delivered MCS according to the transmission bandwidth upper limit in some scenarios of improperly high transmission bandwidths. Therefore, a delivered transmission bandwidth is reduced, power consumption of AP and STA side devices is reduced, and a standby time thereof is increased.

It should be noted that when the transmission bandwidth upper limit of the STA is less than the negotiation bandwidth negotiated by the AP and the STA, a transmission bandwidth is not necessarily improperly high, for example, in this case, both the transmission bandwidth upper limit of the STA and the negotiation bandwidth negotiated by the AP and the STA may be corresponding to a same MCS. However, provided that the MCS corresponding to the transmission bandwidth upper limit of the STA that is lower is selected for bandwidth delivery, a case of an improperly high bandwidth can be definitely avoided.

In this embodiment of the present disclosure, if the processor 702 determines that the transmission bandwidth upper limit of the STA is greater than or equal to the negotiation bandwidth negotiated by the AP and the STA, that is, an improperly high transmission bandwidth problem will not occur, the transmitter 703 delivers an MCS corresponding to the negotiation bandwidth to the STA.

Compared with the prior art, in this embodiment of the present disclosure, not only the negotiation bandwidth negotiated by the AP and the STA is considered, but also the transmission bandwidth upper limit of the STA is considered. The transmission bandwidth upper limit of the STA restricts an actual transmission bandwidth between the AP and the STA, where the transmission bandwidth upper limit of the STA may be obtained based on a transmission bandwidth of an uplink segment of the AP and/or a required transmission bandwidth of the STA, for a specific obtaining manner, refer to a related part of the third method embodiment, details are not described herein any further.

In this embodiment of the present disclosure, selecting the MCS corresponding to the transmission bandwidth upper limit of the STA may be selecting an MCS corresponding to a bandwidth that is closest to and less than the bandwidth upper limit. In addition, the MCS may be selected from an MCS corresponding to a transmission system. The transmission system may be determined based on at least one of the following parameters a downlink segment channel frequency, an on/off state of a short guard interval, or an I/O mode, for details, refer to a related part of the first embodiment and the third embodiment of the bandwidth selection method, details are not described herein any further.

The foregoing describes an embodiment of an AP in embodiments of the present disclosure from a hardware processing perspective, and the following describes the AP in the embodiments of the present disclosure from a modular function entity perspective.

Apparatus Embodiment 4

Figure 8:
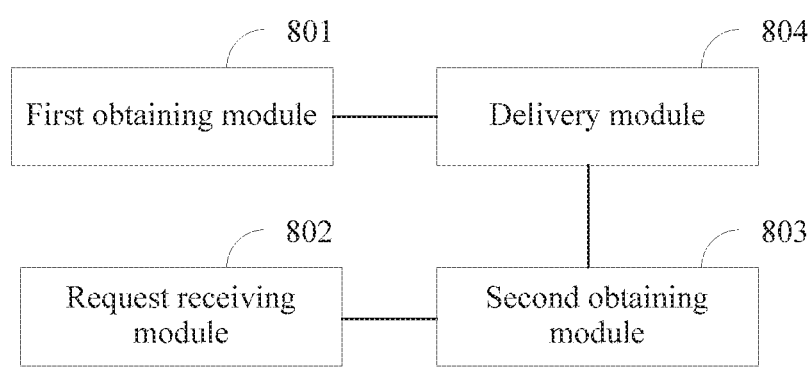
FIG. 8 is a schematic structural diagram of a fourth AP embodiment according to an embodiment of the present disclosure.

Referring to FIG. 8, this embodiment of the present disclosure provides a fourth embodiment of an AP, and the AP in this embodiment includes a first obtaining module 801, a request receiving module 802, a second obtaining module 803, and a delivery module 804.

The first obtaining module 801 is configured to obtain a negotiation bandwidth negotiated by the AP and a station STA.

In this embodiment, that the first obtaining module 801 obtains the negotiation bandwidth negotiated by the AP and the STA may take place when the AP establishes a channel to the STA for the first time, or a channel status between the AP and the STA changes, for example, when the STA moves. Herein, the first obtaining module 801 may obtain, according to a rate adaptation algorithm, the negotiation bandwidth negotiated by the AP and the STA. The rate adaptation algorithm is a prior-art algorithm that is used to obtain a negotiation bandwidth negotiated by an AP and a STA. In specific implementation, first the AP obtains channel quality between the AP and the STA, such as an RSSI, a PSR, a PER, and another parameter, and then, using any one of rate adaptation algorithms and according to the obtained channel quality, calculates the negotiation bandwidth negotiated by the AP and the STA.

The request receiving module 802 is configured to receive a data transmission request of the STA.

When the STA needs to access a network to transmit data, the request receiving module 802 receives the data transmission request of the STA. The request may be sent by the STA, for example, the STA sends a data transmission request to the request receiving module 802 when a STA side user taps play a video, or the request may be sent by an uplink end of the AP, for example, when a WAN side or a LAN side needs to push data to the STA, the WAN side or the LAN side sends a data transmission request of the STA to the request receiving module 802.

The second obtaining module 803 is configured to obtain a transmission bandwidth upper limit of the STA after the request receiving module 802 receives the data transmission request.

In this embodiment of the present disclosure, the transmission bandwidth upper limit of the STA refers to a highest actual bandwidth that can be reached in a process of data transmission between the STA and the AP. Through studying, the inventor finds that in some application scenarios, the transmission bandwidth upper limit of the STA imposes a limitation on an actual transmission bandwidth. For example, if the transmission bandwidth upper limit of the STA is less than a negotiation bandwidth negotiated by the AP and the STA, it is likely that an actual transmission bandwidth between the AP and the STA cannot reach a transmission bandwidth selected based on an existing rate adaptation algorithm, thereby causing an improperly high transmission bandwidth problem. Therefore, in this embodiment, after the data transmission request of the STA is received, a bandwidth is not directly delivered according to the negotiation bandwidth negotiated by the AP and the STA. Instead, it is necessary to consider the transmission bandwidth upper limit that is of the STA and restricts the actual transmission bandwidth between the AP and the STA.

The delivery module 804 is configured to deliver a first MCS to the STA if the transmission bandwidth upper limit is less than the negotiation bandwidth, where the first MCS is less than an MCS that corresponds to the negotiation bandwidth and that is in a correspondence between a bandwidth and an MCS, and is greater than or equal to an MCS that corresponds to the transmission bandwidth upper limit and that is in the correspondence between a bandwidth and an MCS.

The correspondence between a bandwidth and an MCS reflects a correspondence between a negotiation bandwidth negotiated by the AP and the STA and an MCS delivered by the AP to the STA. At present, data transmission between an AP and a STA can be only based on several fixed MCSs, and which MCS is based on is determined by a negotiation bandwidth negotiated by the AP and the STA. Therefore, currently, a correspondence between a bandwidth and an MCS is preset, and then an MCS corresponding to the negotiation bandwidth negotiated by the AP and the STA is determined from the foregoing correspondence after the negotiation bandwidth negotiated by the AP and the STA is obtained using a rate adaptation algorithm or another manner. For example, an existing bandwidth control table is one presentation form of the foregoing correspondence. Herein, the foregoing correspondence may be a correspondence in a specific communications standard, for example, a correspondence in the IEEE 802.11a/b/g/n/ac standard.

There may be multiple implementation manners of selecting, from the correspondence between a bandwidth and an MCS such as the bandwidth control table, an MCS corresponding to a bandwidth, which is not limited in this embodiment of the present disclosure. In the following, only one optional implementation manner is used as an example for description. An MCS corresponding to a bandwidth may be an MCS corresponding to a bandwidth that is in the bandwidth control table and that is closest to and less than the bandwidth.

In the prior art, the delivery module 804 directly delivers the MCS corresponding to the negotiation bandwidth negotiated by the AP and the STA. The transmission bandwidth upper limit of the STA also restricts the actual transmission bandwidth between the AP and the STA, for example, when the MCS that corresponds to the transmission bandwidth upper limit of the STA and that is in the correspondence between a bandwidth and an MCS is less than the MSC corresponding to the negotiation bandwidth negotiated by the AP and the STA, it indicates that, in this case, an improperly high transmission bandwidth is caused if the MCS corresponding to the negotiation bandwidth negotiated by the AP and the STA is delivered. Therefore, it is necessary to reduce the delivered MCS, that is, the delivered MCS is less than the MCS corresponding to the negotiation bandwidth negotiated by the AP and the STA. However, to avoid a case in which an unlimited reduction of the MCS causes an excessively low bandwidth, which affects transmission efficiency, the reduced MCS needs to be greater than or equal to the MCS corresponding to the transmission bandwidth upper limit of the STA. An MCS selected based on this manner is more proper.

It should be noted that on the premise that an MCS that is finally used for delivery is greater than or equal to the MCS corresponding to the transmission bandwidth upper limit, a smaller MCS that is finally used for delivery is more helpful in resolving an improperly high transmission bandwidth problem. Therefore, the delivery module 804 preferably selects and delivers the MCS corresponding to the transmission bandwidth upper limit of the STA to the STA.

It can be learned from the foregoing technical solutions that in this embodiment, during bandwidth selection, not only a negotiation bandwidth negotiated by an AP and a STA is considered, but also a transmission bandwidth upper limit of the STA is considered. When the transmission bandwidth upper limit of the STA is less than the negotiation bandwidth negotiated by the AP and the STA, it indicates that an improperly high transmission bandwidth is likely caused if a delivery is performed based on an MCS corresponding to the negotiation bandwidth negotiated by the AP and the STA. Therefore, a delivered MCS is reduced, and a first MCS is delivered to the STA, where the first MCS is less than the MCS that corresponds to the negotiation bandwidth negotiated by the AP and the STA and that is in a correspondence between a bandwidth and an MCS, and is greater than or equal to an MCS that corresponds to the transmission bandwidth upper limit and that is in the correspondence between a bandwidth and an MCS, thereby reducing a finally delivered MCS according to the transmission bandwidth upper limit of the STA in some scenarios of improperly high transmission bandwidths. Therefore, a delivered transmission bandwidth is reduced, power consumption of AP and STA side devices is reduced, and a standby time thereof is increased.

However, in this embodiment, when the delivered transmission bandwidth is reduced, the existing rate adaptation algorithm is not changed. Therefore, this manner is simple and easy to perform without increasing algorithm complexity and a calculation amount, can ensure a final bandwidth selection effect, and is applicable to any one of rate adaptation algorithms in the prior art.

In this embodiment of the present disclosure, if the delivery module 804 determines that the transmission bandwidth upper limit of the STA is greater than or equal to the negotiation bandwidth negotiated by the AP and the STA, that is, an improperly high transmission bandwidth problem will not occur, the MCS corresponding to the negotiation bandwidth negotiated by the AP and the STA is directly selected and delivered to the STA.

In this embodiment of the present disclosure, after the delivery module 804 performs MCS delivery, a transmission module performs data transmission with the STA based on the delivered first MCS. However, in the data transmission process, the MCS corresponding to the negotiation bandwidth negotiated by the AP and the STA may be updated, for example, when the channel status between the AP and the STA changes (for example, when the STA moves). In this case, the AP in this embodiment further includes the transmission module and a determining module. The determining module determines whether the MCS corresponding to the transmission bandwidth upper limit of the STA is less than an updated negotiation bandwidth, and if yes, the first MCS is updated, and the delivery module 804 is instructed to deliver an updated first MCS to the STA, where the updated first MCS is less than an MCS corresponding to the updated negotiation bandwidth, and is greater than or equal to the MCS corresponding to the transmission bandwidth upper limit of the STA.

It should be noted that in this embodiment of the present disclosure, the MCS corresponding to the transmission bandwidth upper limit of the STA may be also updated, and to adapt to the update, the second obtaining module 803 and the delivery module 804 may cyclically work, or the delivery module 804 re-delivers the first MCS every time the MCS corresponding to the transmission bandwidth upper limit of the STA is updated, thereby adjusting the finally delivered bandwidth in real time.

In this embodiment of the present disclosure, respectively according to the negotiation bandwidth and the transmission bandwidth upper limit, corresponding MCSs may be determined from the correspondence between a bandwidth and an MCS after the AP obtains the negotiation bandwidth negotiated by the AP and the STA and the transmission bandwidth upper limit of the STA, a comparison between the negotiation bandwidth and the transmission bandwidth upper limit is implemented by comparing the MCSs. This case is described using an embodiment in the following.

Apparatus Embodiment 5

Figure 9:
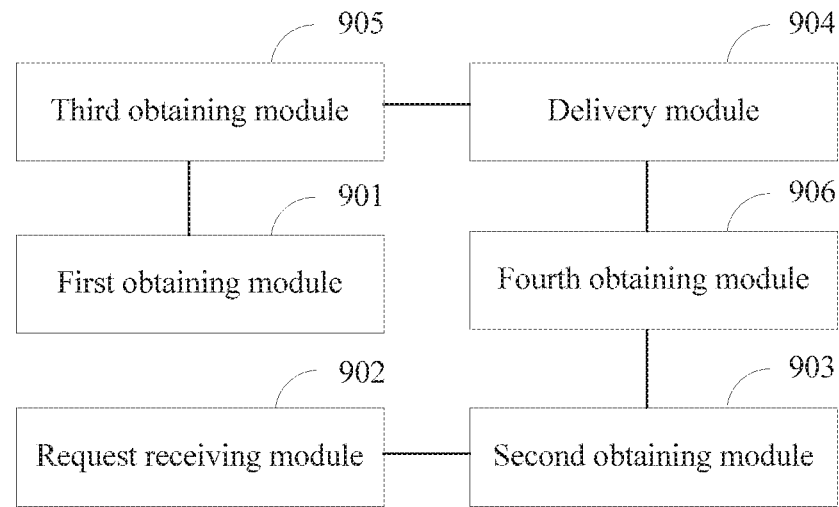
FIG. 9 is a schematic structural diagram of a fifth AP embodiment according to an embodiment of the present disclosure.

Referring to FIG. 9, this embodiment of the present disclosure provides a fifth embodiment of an AP, and the AP in this embodiment includes a first obtaining module 901, a request receiving module 902, a second obtaining module 903, a delivery module 904, a third obtaining module 905, and a fourth obtaining module 906.

The first obtaining module 901 is configured to obtain a negotiation bandwidth negotiated by the AP and a station STA.

In this embodiment, that the first obtaining module 901 obtains the negotiation bandwidth negotiated by the AP and the STA may take place when the AP establishes a channel to the STA for the first time, or a channel status between the AP and the STA changes, for example, when the STA moves. Herein, the first obtaining module 901 may obtain, according to a rate adaptation algorithm, the negotiation bandwidth negotiated by the AP and the STA.

The third obtaining module 905 is configured to obtain a second MCS according to the negotiation bandwidth, where the second MCS is an MCS that corresponds to the negotiation bandwidth and that is in the correspondence between a bandwidth and an MCS.

The bandwidth control table shown in Table 1 is used as an example for description. If the negotiation bandwidth negotiated by the AP and the STA is 40 Mbps, MCS4 corresponding to 39 Mbps, that is, a bandwidth that is closest to and less than 40 Mbps, may be selected and used as the second MCS corresponding to 40 Mbps.

The request receiving module 902 is configured to receive a data transmission request of the STA.

The second obtaining module 903 is configured to obtain a transmission bandwidth upper limit of the STA after the request receiving module receives the data transmission request.

The fourth obtaining module 906 is configured to obtain a third MCS according to the transmission bandwidth upper limit, where the third MCS is an MCS that corresponds to the transmission bandwidth upper limit and that is in the correspondence between a bandwidth and an MCS.

The bandwidth control table shown in Table 1 is still used as an example for description. If the transmission bandwidth upper limit of the STA is 20 Mbps, MCS2 corresponding to 19.5 Mbps, that is, a bandwidth that is closest to and less than 20 Mbps, may be selected and used as the third MCS corresponding to 20 Mbps.

The delivery module 904 is configured to deliver a first MCS to the STA if the third MCS is less than the second MCS.

The second MCS is an MCS selected based on a rate negotiated by the AP and the STA, and the third MCS is an MCS selected based on the transmission bandwidth upper limit of the STA. In the prior art, the second MCS is directly delivered. However, the transmission bandwidth upper limit of the STA also restricts an actual transmission bandwidth between the AP and the STA, for example, when the third MCS is less than the second MCS, it indicates that in this case, an improperly high transmission bandwidth is caused if the second MCS is delivered. Therefore, it is necessary to reduce the delivered MCS and select the first MCS that is less than the second MCS and is greater than or equal to the third MCS for delivery.

It should be noted that on the premise that an MCS that is finally used for delivery is greater than or equal to the third MCS, a smaller MCS that is finally used for delivery is more helpful in resolving an improperly high transmission bandwidth problem. Therefore, the delivery module 904 preferably selects and delivers the third MCS to the STA.

It can be learned from the foregoing technical solutions that in this embodiment, during bandwidth selection, not only a negotiation bandwidth negotiated by an AP and a STA is considered, but also a transmission bandwidth upper limit of the STA is considered, and a second MCS and a third MCS are determined from a bandwidth control table respectively according to the negotiation bandwidth negotiated by the AP and the STA and the transmission bandwidth upper limit of the STA. When the third MCS is less than the second MCS, it indicates that an improperly high transmission bandwidth is caused if a delivery is performed based on the second MCS. Therefore, a delivered MCS is reduced, and a first MCS that is less than the second MCS and is greater than or equal to the third MCS is delivered to the STA, thereby reducing a finally delivered MCS according to the transmission bandwidth upper limit of the STA in some scenarios of improperly high transmission bandwidths. Therefore, a delivered transmission bandwidth is reduced, power consumption of AP and STA side devices is reduced, and a standby time thereof is increased.

It can be learned from the foregoing technical solutions that in this embodiment, during bandwidth selection, not only a negotiation bandwidth negotiated by an AP and a STA is considered, but also a transmission bandwidth upper limit of the STA is considered, and a second MCS and a third MCS are determined respectively according to the negotiation bandwidth negotiated by the AP and the STA and the transmission bandwidth upper limit of the STA. When the third MCS is less than the second MCS, it indicates that an improperly high transmission bandwidth is caused if a delivery is performed based on the second MCS. Therefore, a delivered MCS is reduced, and a first MCS that is less than the second MCS and is greater than or equal to the third MCS is delivered to the STA, thereby reducing a finally delivered MCS according to the transmission bandwidth upper limit of the STA in some scenarios of improperly high transmission bandwidths. Therefore, a delivered transmission bandwidth is reduced, power consumption of AP and STA side devices is reduced, and a standby time thereof is increased.

In this embodiment, during implementation of bandwidth selection, not only a negotiation bandwidth negotiated by an AP and a STA is considered, but also a transmission bandwidth upper limit of the STA is considered, thereby resolving an improperly high transmission bandwidth problem. In specific implementation, corresponding MCSs are first selected based on the foregoing two bandwidths, and then the MCSs are compared to determine a finally delivered MCS. However, actually, the foregoing two bandwidths may be compared first, and the finally delivered MCS is determined according to a comparison result. The following provides an embodiment for description.

Apparatus Embodiment 6

Figure 10:
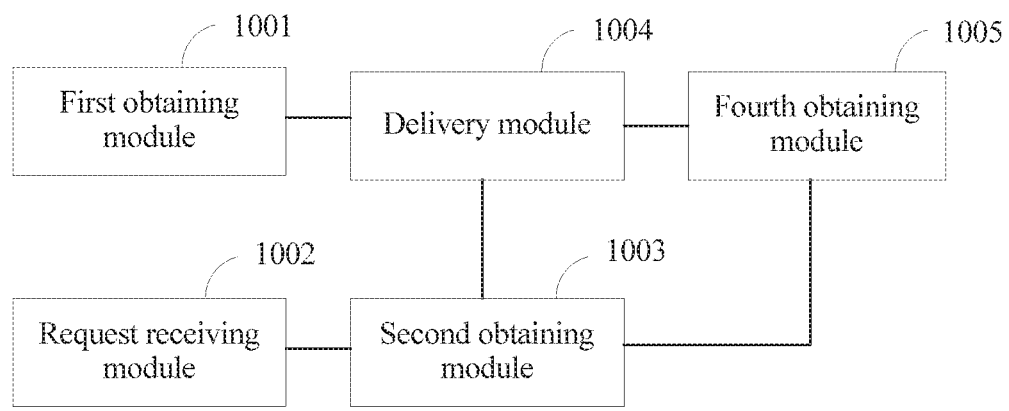
FIG. 10 is a schematic structural diagram of a sixth AP embodiment according to an embodiment of the present disclosure.

Referring to FIG. 10, this embodiment of the present disclosure provides a sixth embodiment of an AP, and the AP in this embodiment includes a first obtaining module 1001, a request receiving module 1002, a second obtaining module 1003, a delivery module 1004, and a fourth obtaining module 1005.

The first obtaining module 1001 is configured to obtain a negotiation bandwidth negotiated by the AP and a station STA.

In this embodiment, that the first obtaining module 1001 obtains the negotiation bandwidth negotiated by the AP and the STA may take place when the AP establishes a channel to the STA for the first time, or a channel status between the AP and the STA changes, for example, when the STA moves. Herein, the first obtaining module 1001 may obtain, according to a rate adaptation algorithm, the negotiation bandwidth negotiated by the AP and the STA.

The request receiving module 1002 is configured to receive a data transmission request of the STA.

The request may be sent by the STA, or may be sent by an uplink end of the AP.

The second obtaining module 1003 is configured to obtain a transmission bandwidth upper limit of the STA after the request receiving module 1002 receives the data transmission request.

The fourth obtaining module 1005 is configured to obtain a third MCS according to the transmission bandwidth upper limit, where the third MCS is an MCS that corresponds to the transmission bandwidth upper limit and that is in the correspondence between a bandwidth and an MCS.

The correspondence between a bandwidth and an MCS reflects a correspondence between a negotiation bandwidth negotiated by the AP and the STA and an MCS delivered by the AP to the STA. One presentation form of the correspondence is an existing bandwidth control table.

The delivery module 1004 is configured to deliver the third MCS to the STA if the transmission bandwidth upper limit is less than the negotiation bandwidth.

Unlike the second apparatus embodiment in which corresponding MCSs are first selected according to the foregoing two bandwidths and then the MCSs are compared, in this embodiment, the foregoing two bandwidths are compared first, and if the transmission bandwidth upper limit of the STA is less than the negotiation bandwidth negotiated by the AP and the STA, it indicates that in this case, a case of an improperly high transmission bandwidth may occur. Therefore, the MCS corresponding to the lower bandwidth of the foregoing two bandwidths, that is, the transmission bandwidth upper limit of the STA, is selected and delivered to the STA, which can also avoid a case of an improperly high transmission bandwidth.

It can be learned from the foregoing technical solutions that in this embodiment, during bandwidth selection, not only an obtained bandwidth negotiated by an AP and a STA is considered, but also a transmission bandwidth upper limit of the STA is considered. When the transmission bandwidth upper limit of the STA is less than the negotiation bandwidth negotiated by the AP and the STA, an MCS corresponding to the transmission bandwidth upper limit of the STA that is lower is selected for delivery, thereby reducing a finally delivered MCS according to the transmission bandwidth upper limit in some scenarios of improperly high transmission bandwidths. Therefore, a delivered transmission bandwidth is reduced, power consumption of AP and STA side devices is reduced, and a standby time thereof is increased.

It should be noted that when the transmission bandwidth upper limit of the STA is less than the negotiation bandwidth negotiated by the AP and the STA, a transmission bandwidth is not necessarily improperly high, for example, in this case, both the transmission bandwidth upper limit of the STA and the negotiation bandwidth negotiated by the AP and the STA may be corresponding to a same MCS. However, provided that the MCS corresponding to the transmission bandwidth upper limit of the STA that is lower is selected for bandwidth delivery, a case of an improperly high bandwidth can be definitely avoided.

In this embodiment of the present disclosure, if the delivery module determines that the transmission bandwidth upper limit of the STA is greater than or equal to the negotiation bandwidth negotiated by the AP and the STA, that is, an improperly high transmission bandwidth problem will not occur, an MCS corresponding to the negotiation bandwidth is delivered to the STA.

Compared with the prior art, in this embodiment of the present disclosure, not only the negotiation bandwidth negotiated by the AP and the STA is considered, but also the transmission bandwidth upper limit of the STA is considered. The transmission bandwidth upper limit of the STA restricts an actual transmission bandwidth between the AP and the STA, where the transmission bandwidth upper limit of the STA may be obtained based on a transmission bandwidth of an uplink segment of the AP and/or a required transmission bandwidth of the STA, for a specific obtaining manner, refer to a related part of the third method embodiment, details are not described herein any further.

In this embodiment of the present disclosure, selecting the MCS corresponding to the transmission bandwidth upper limit of the STA may be selecting an MCS corresponding to a bandwidth that is closest to and less than the bandwidth upper limit. In addition, the MCS may be selected from an MCS corresponding to a transmission system. The transmission system may be determined based on at least one of the following parameters a downlink segment channel frequency, an on/off state of a short guard interval, or an I/O mode, for details, refer to a related part of the first embodiment and the third embodiment of the bandwidth selection method, details are not described herein any further.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technic

What is claimed is:
1. A bandwidth selection method of a Wireless Fidelity technology, wherein an access point (AP) obtains a negotiation bandwidth negotiated by the AP and a station (STA); and wherein the method comprises:
   receiving, by the AP, a data transmission request of the STA;
   obtaining, by the AP, a transmission bandwidth upper limit of the STA; and delivering, by the AP, a first modulation and coding scheme (MCS) to the STA when the transmission bandwidth upper limit is less than the negotiation bandwidth, wherein the first MCS is less than an MCS that corresponds to the negotiation bandwidth and that is in a correspondence between a bandwidth and the MCS, and is greater than or equal to an MCS that corresponds to the transmission bandwidth upper limit and that is in the correspondence between the bandwidth and the MCS.

2. The method according to claim 1, further comprising:
obtaining a second MCS according to the negotiation bandwidth, wherein the second MCS is the MCS that corresponds to the negotiation bandwidth and that is in the correspondence between the bandwidth and the MCS; and
obtaining a third MCS according to the transmission bandwidth upper limit,
wherein the third MCS is the MCS that corresponds to the transmission bandwidth upper limit and that is in the correspondence between the bandwidth and the MCS; and
wherein delivering, by the AP, the first MCS to the STA when the transmission bandwidth upper limit is less than the negotiation bandwidth comprises delivering, by the AP, the first MCS to the STA when the third MCS is less than the second MCS.

3. The method according to claim 2, wherein delivering, by the AP, the first MCS to the STA comprises delivering, by the AP, the third MCS to the STA.

4. The method according to claim 1, further comprising obtaining a third MCS according to the transmission bandwidth upper limit, wherein the third MCS is the MCS that corresponds to the transmission bandwidth upper limit and that is in the correspondence between a bandwidth and an MCS, and wherein delivering, by the AP, the first MCS to the STA comprises delivering, by the AP, the third MCS to the STA.

5. The method according to claim 1, wherein the transmission bandwidth upper limit of the STA is obtained based on at least one of a transmission bandwidth of an uplink segment of the AP or a required transmission bandwidth of the STA.

6. The method according to claim 5, wherein the transmission bandwidth upper limit of the STA is the lower one of the transmission bandwidth of the uplink segment of the AP and the required transmission bandwidth of the STA.

7. The method according to claim 5, wherein a manner of obtaining the transmission bandwidth of the uplink segment of the AP comprises:
obtaining, by the AP, a size of a resource block allocated to the uplink segment of the AP; and
obtaining, by the AP, the transmission bandwidth of the uplink segment of the AP based on the size of the resource block.

8. The method according to claim 6, wherein a manner of obtaining the transmission bandwidth of the uplink segment of the AP comprises:
obtaining, by the AP, a size of a resource block allocated to the uplink segment of the AP; and
obtaining, by the AP, the transmission bandwidth of the uplink segment of the AP based on the size of the resource block.

9. The method according to claim 5, wherein a manner of obtaining the required transmission bandwidth of the STA comprises:

obtaining, by the AP, a service type of transmission data from the data transmission request; and
obtaining, by the AP, the required transmission bandwidth of the STA based on the service type.

10. The method according to claim 1, further comprising:
performing, by the AP, data transmission with the STA based on the first MCS;
determining, by the AP, whether the MCS corresponding to the transmission bandwidth upper limit is less than an MCS corresponding to an updated negotiation bandwidth when the MCS corresponding to the negotiation bandwidth is updated in a data transmission process; and
updating the first MCS and delivering an updated first MCS to the STA when the MCS corresponding to the transmission bandwidth upper limit is less than the MCS corresponding to the updated negotiation bandwidth, wherein the updated first MCS is less than the MCS corresponding to the updated negotiation bandwidth, and is greater than or equal to the MCS corresponding to the transmission bandwidth upper limit.

11. An access point (AP), comprising:
a transmitter;
a receiver; and
a processor coupled to the transmitter and the receiver,
wherein the receiver is configured to receive a data transmission request of a station (STA),
wherein the processor is configured to:
obtain a negotiation bandwidth negotiated by the AP and the STA; and
obtain a transmission bandwidth upper limit of the STA after the receiver receives the data transmission request, and
wherein the transmitter is configured to deliver a first modulation and coding scheme (MCS) to the STA when the processor determines that the transmission bandwidth upper limit is less than the negotiation bandwidth, wherein the first MCS is less than an MCS that corresponds to the negotiation bandwidth and that is in a correspondence between a bandwidth and an MCS, and is greater than or equal to an MCS that corresponds to the transmission bandwidth upper limit and that is in the correspondence between a bandwidth and an MCS.

12. The AP according to claim 11, wherein the processor is further configured to:
obtain a second MCS according to the negotiation bandwidth; and
obtain a third MCS according to the transmission bandwidth upper limit, wherein the second MCS is the MCS that corresponds to the negotiation bandwidth and that is in the correspondence between the bandwidth and the MCS,
wherein the third MCS is the MCS that corresponds to the transmission bandwidth upper limit and that is in the correspondence between the bandwidth and the MCS, and
wherein the transmitter is configured to deliver the first MCS to the STA when the processor determines that the third MCS is less than the second MCS.

13. The AP according to claim 12, wherein the transmitter is configured to deliver the third MCS to the STA.

14. The AP according to claim 11, wherein the processor is further configured to obtain a third MCS according to the transmission bandwidth upper limit, wherein the third MCS is the MCS that corresponds to the transmission bandwidth upper limit and that is in the correspondence between the bandwidth and the MCS, and wherein the transmitter is configured to deliver the third MCS to the STA.

15. The AP according to claim 11, wherein the transmission bandwidth upper limit of the STA is obtained based on at least one of a transmission bandwidth of an uplink segment of the AP or a required transmission bandwidth of the STA.

16. The AP according to claim 15, wherein the transmission bandwidth upper limit of the STA is the lower one of the transmission bandwidth of the uplink segment of the AP and the required transmission bandwidth of the STA.

17. The AP according to claim 15, wherein a manner of obtaining the transmission bandwidth of the uplink segment of the AP comprises:
    obtaining, by the processor, a size of a resource block allocated to the uplink segment of the AP; and
    obtaining, by the processor, the transmission bandwidth of the uplink segment of the AP based on the size of the resource block.

18. The AP according to claim 16, wherein a manner of obtaining the transmission bandwidth of the uplink segment of the AP comprises:
    obtaining, by the processor, a size of a resource block allocated to the uplink segment of the AP; and
    obtaining, by the processor, the transmission bandwidth of the uplink segment of the AP based on the size of the resource block.

19. The AP according to claim 15, wherein a manner of obtaining the required transmission bandwidth of the STA comprises:
    obtaining, by the processor, a service type of transmission data from the data transmission request; and
    obtaining, by the processor, the required transmission bandwidth of the STA based on the service type.

20. The AP according to claim 11, wherein the receiver and the transmitter are further configured to perform data transmission with the STA based on the first MCS, and wherein the processor is further configured to:
    determine whether the MCS corresponding to the transmission bandwidth upper limit is less than an MCS corresponding to an updated negotiation bandwidth when the MCS corresponding to the negotiation bandwidth is updated in a data transmission process; and
    update the first MCS and instruct the transmitter to deliver an updated first MCS to the STA when the MCS corresponding to the transmission bandwidth upper limit is less than the MCS corresponding to the updated negotiation bandwidth, wherein the updated first MCS is less than the MCS corresponding to the updated negotiation bandwidth, and is greater than or equal to the MCS corresponding to the transmission bandwidth upper limit.

* * * * *

UNITED STATES PATENT AND TRADEMARK OFFICE
CERTIFICATE OF CORRECTION

PATENT NO. : 10,069,593 B2
APPLICATION NO. : 15/322301
DATED : September 4, 2018
INVENTOR(S) : Jianwei Li and Guihong Zhang Page 1 of 1

It is certified that error appears in the above-identified patent and that said Letters Patent is hereby corrected as shown below:

In the Specification

Column 32, Line 57: delete "of the technic" and replace with "of the technical solutions of the embodiments of the present invention."

Signed and Sealed this
Sixth Day of November, 2018

Andrei Iancu
*Director of the United States Patent and Trademark Office*